(12) United States Patent
Numata

(10) Patent No.: US 11,804,198 B2
(45) Date of Patent: Oct. 31, 2023

(54) INFORMATION PROCESSING APPARATUS, DISPLAY CONTROL METHOD, AND IMAGING APPARATUS

(71) Applicant: SONY GROUP CORPORATION, Tokyo (JP)

(72) Inventor: Tomoki Numata, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 32 days.

(21) Appl. No.: 17/604,626

(22) PCT Filed: Apr. 14, 2020

(86) PCT No.: PCT/JP2020/016362
§ 371 (c)(1),
(2) Date: Oct. 18, 2021

(87) PCT Pub. No.: WO2020/218076
PCT Pub. Date: Oct. 29, 2020

(65) Prior Publication Data
US 2022/0199052 A1 Jun. 23, 2022

(30) Foreign Application Priority Data
Apr. 26, 2019 (JP) .................. 2019-085075

(51) Int. Cl.
*G09G 5/00* (2006.01)
*H04N 23/53* (2023.01)
*H04N 23/63* (2023.01)

(52) U.S. Cl.
CPC ............. *G09G 5/006* (2013.01); *H04N 23/53* (2023.01); *H04N 23/63* (2023.01);
(Continued)

(58) Field of Classification Search
CPC ............. G09G 5/006; G09G 2330/021; G09G 2330/027; G09G 2360/04; H04N 23/63; H04N 23/53
See application file for complete search history.

(56) References Cited

U.S. PATENT DOCUMENTS

2013/0083228 A1    4/2013   Iwatani

FOREIGN PATENT DOCUMENTS

JP          07-298109 A       11/1995
JP          2018-074216 A      5/2018
(Continued)

OTHER PUBLICATIONS

International Search Report and Written Opinion of PCT Application No. PCT/JP2020/016362, dated Jun. 23, 2020, 09 pages of ISRWO.

*Primary Examiner* — Abbas I Abdulselam
(74) *Attorney, Agent, or Firm* — CHIP LAW GROUP

(57) ABSTRACT

An information processing apparatus, a display control method, and an imaging apparatus for shortening a switching time of a display device that displays a video. The information processing apparatus includes a display control unit that, in a case where display of a video is switched from a first display unit to which a first video signal is input via a first bus to a second display unit to which a second video signal is input via a second bus, causes the first display unit to transition from an activated state in which operation is performed in a light-emitting state to a standby state in which operation is performed in a non-light-emitting state or a stopped state in which operation is stopped in the non-light-emitting state, and causes the second display unit to transition from the standby state or the stopped state to the activated state.

19 Claims, 21 Drawing Sheets

(52) U.S. Cl.
CPC . *G09G 2330/021* (2013.01); *G09G 2330/027* (2013.01); *G09G 2360/04* (2013.01); *G09G 2370/045* (2013.01)

(56) References Cited

FOREIGN PATENT DOCUMENTS

| | | |
|---|---|---|
| WO | 2012/001749 A1 | 1/2012 |
| WO | 2019/008874 A1 | 1/2019 |

INFORMATION PROCESSING APPARATUS, DISPLAY CONTROL METHOD, AND IMAGING APPARATUS

CROSS REFERENCE TO RELATED APPLICATIONS

This application is a U.S. National Phase of International Patent Application No. PCT/JP2020/016362 filed on Apr. 14, 2020, which claims priority benefit of Japanese Patent Application No. JP 2019-085075 filed in the Japan Patent Office on Apr. 26, 2019. Each of the above-referenced applications is hereby incorporated herein by reference in its entirety.

TECHNICAL FIELD

The present technology relates to an information processing apparatus, a display control method, a program, and an imaging apparatus, and more particularly, to an information processing apparatus, a display control method, a program, and an imaging apparatus capable of shortening a switching time of a display device that displays a video.

BACKGROUND ART

Conventionally, there has been proposed a video camera including an electronic view finder (EVF) and an openable and closable LCD panel and capable of switching a display device that displays a captured video by opening and closing the LCD panel. Specifically, when the LCD panel is closed, an LCD panel switch provided in a main body is physically turned on, power to the LCD panel is cut off, display of the LCD panel is stopped, power is supplied to the EVF, and a video is displayed on the EVF. On the other hand, when the LCD panel is opened, the LCD panel switch is physically turned off, power to the EVF is cut off, display of the EVF is stopped, power is supplied to the LCD panel, and a video is displayed on the LCD panel (see, for example, Patent Document 1).

CITATION LIST

Patent Document

Patent Document 1: Japanese Patent Application Laid-Open No. H7-298109

SUMMARY OF THE INVENTION

Problems to be Solved by the Invention

However, in the invention described in Patent Document 1, in addition to the necessity of opening and closing the LCD panel, the supply of the video signal and the power to the one display device is started after the supply of the video signal and the power to the other display device is stopped. Thus, a switching time becomes long.

The present technology has been made in view of such a situation, and an object thereof is to shorten a switching time of a display device that displays a video.

Solutions to Problems

An information processing apparatus according to a first aspect of the present technology includes: a display control unit that, in a case where display of a video is switched from a first display unit to which a first video signal is input via a first bus to a second display unit to which a second video signal is input via a second bus, causes the first display unit to transition from an activated state in which operation is performed in a light-emitting state to a standby state in which operation is performed in a non-light-emitting state or a stopped state in which operation is stopped in the non-light-emitting state, and causes the second display unit to transition from the standby state or the stopped state to the activated state.

An information processing method according to the first aspect of the present technology, in which in an information processing apparatus, in a case where display of a video is switched from a first display unit to which a first video signal is input via a first bus to a second display unit to which a second video signal is input via a second bus, the first display unit is caused to transition from an activated state in which operation is performed in a light-emitting state to a standby state in which operation is performed in a non-light-emitting state or a stopped state in which operation is stopped in the non-light-emitting state, and the second display unit is caused to transition from the standby state or the stopped state to the activated state.

A program according to the first aspect of the present technology causes a computer to execute processing of, in a case where display of a video is switched from a first display unit to which a first video signal is input via a first bus to a second display unit to which a second video signal is input via a second bus, causing the first display unit to transition from an activated state in which operation is performed in a light-emitting state to a standby state in which operation is performed in a non-light-emitting state or a stopped state in which operation is stopped in the non-light-emitting state, and causing the second display unit to transition from the standby state or the stopped state to the activated state.

An imaging apparatus according to a second aspect of the present technology includes: an imaging unit; a first bus; a second bus; a first display unit to which a first video signal based on a video signal captured by the imaging unit is input via the first bus; a second display unit to which a second video signal based on a video signal captured by the imaging unit is input via the second bus; and a display control unit that, in a case where display of a video is switched from the first display unit to the second display unit, causes the first display unit to transition from an activated state in which operation is performed in a light-emitting state to a standby state in which operation is performed in a non-light-emitting state or a stopped state in which operation is stopped in the non-light-emitting state, and causes the second display unit to transition from the standby state or the stopped state to the activated state.

An information processing apparatus according to a third aspect of the present technology includes: a display control unit that, in a case where display of a video is switched from a first display unit to which a first video signal is input via a first bus to a second display unit to which a second video signal is input via a second bus, causes processing of causing the first display unit to transition from a light-emitting state to a non-light-emitting state and processing of causing the second display unit to transition from the non-light-emitting state to the light-emitting state to be performed in parallel.

In the first aspect of the present technology, in a case where display of a video is switched from a first display unit to which a first video signal is input via a first bus to a second display unit to which a second video signal is input via a second bus, the first display unit transitions from an activated state in which operation is performed in a light-emitting state to a standby state in which operation is performed in a non-light-emitting state or a stopped state in which operation is stopped in the non-light-emitting state, and the second display unit transitions from the standby state or the stopped state to the activated state.

In the second aspect of the present technology, a first video signal based on a video signal captured by an imaging unit is input via a first bus, a second video signal based on a video signal captured by the imaging unit is input via the second bus, and in a case where display of a video is switched from the first display unit to the second display unit, the first display unit transitions from an activated state in which operation is performed in a light-emitting state to a standby state in which operation is performed in a non-light-emitting state or a stopped state in which operation is stopped in the non-light-emitting state, and the second display unit transitions from the standby state or the stopped state to the activated state.

In the third aspect of the present technology, in a case where display of a video is switched from a first display unit to which a first video signal is input via a first bus to a second display unit to which a second video signal is input via a second bus, processing of causing the first display unit to transition from a light-emitting state to a non-light-emitting state and processing of causing the second display unit to transition from the non-light-emitting state to the light-emitting state are performed in parallel.

MODE FOR CARRYING OUT THE INVENTION

Hereinafter, modes for carrying out the present technology will be described. Note that the description will be given in the following order.

1. First Embodiment (Example of Using Self-Light-Emitting Type Display Device and Another Light-Emitting Type Display Device)
2. Second Embodiment (Example of Using Only Self-Light-Emitting Type Display Devices)
3. Third Embodiment (Example of Using Only Other Light-Emitting Type Display Devices)
4. Modified Examples
5. Others

1. FIRST EMBODIMENT

First, a first embodiment of the present technology will be described with reference to FIGS. 1 to 12.

Configuration Example of Imaging Apparatus 101

Figure 1:
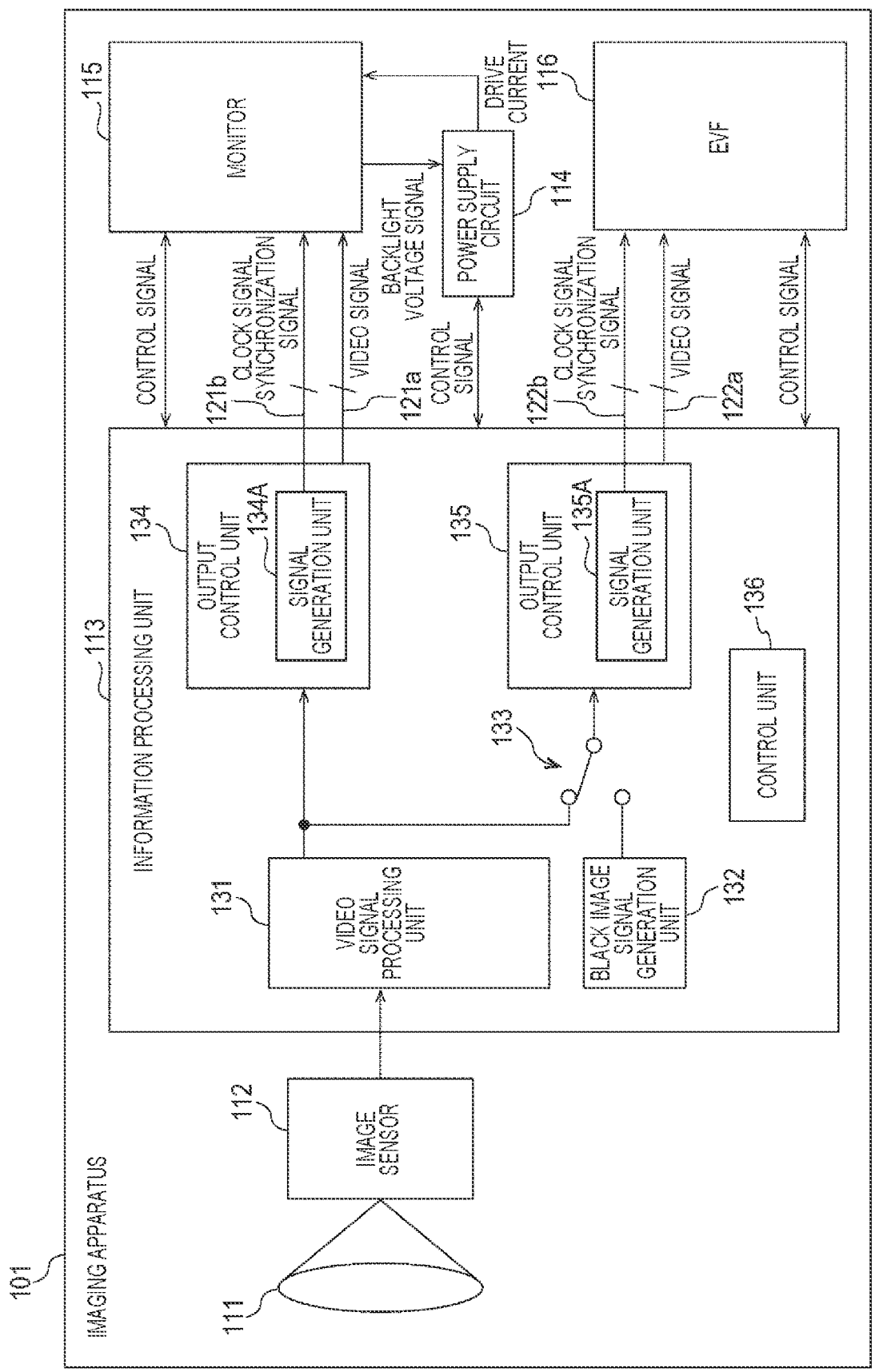
FIG. 1 is a block diagram illustrating a first embodiment of an imaging apparatus to which the present technology is applied.

FIG. 1 is a block diagram illustrating a configuration example of an imaging apparatus 101 to which the present technology is applied.

The imaging apparatus 101 includes an optical system 111, an image sensor 112, an information processing unit 113, a power supply circuit 114, a monitor 115, and an electronic view finder (EVF) 116.

The optical system 111 includes, for example, a lens and the like, and forms an image by incident light from a subject on a light receiving surface of the image sensor 112.

The image sensor 112 includes an image sensor of an arbitrary system such as a complementary metal oxide semiconductor (CMOS) image sensor, a charged-coupled devices (CCD) image sensor, and the like. The image sensor 112 converts the image by the incident light into a video signal of an electric signal, and supplies the video signal to a video signal processing unit 131 of the information processing unit 113.

The information processing unit 113 includes, for example, a system on a chip (SoC). The information processing unit 113 includes the video signal processing unit 131, a black image signal generation unit 132, a switching unit 133, an output control unit 134, an output control unit 135, and a control unit 136.

The video signal processing unit 131 performs predetermined signal processing such as conversion of an RGB video signal into a Y/C video signal and the like. The video signal processing unit 131 supplies the video signal after the signal processing to the switching unit 133 and the output control unit 134.

The black image signal generation unit 132 generates a black image signal that is a video signal for displaying a black image in which all pixels are black, and supplies the black image signal to the switching unit 133.

The switching unit 133 selects one of the video signal from the video signal processing unit 131 and the black image signal from the black image signal generation unit 132 by switching a state of a contact under the control of the control unit 136, and supplies the selected signal to the output control unit 135.

The output control unit 134 performs output control to convert the video signal into a resolution and a format suitable for the monitor 115 and to output the converted video signal (hereinafter referred to as a monitor video signal) to the monitor 115 via a bus 121*a*.

Furthermore, the output control unit 134 incorporates a signal generation unit 134A. The signal generation unit 134A performs output control to generate a clock signal and a synchronization signal (a horizontal synchronization signal and a vertical synchronization signal) and to output the signals to the monitor 115 via a bus 121*b*.

The output control unit 135 performs output control to convert the video signal or the black image signal into a resolution and a format suitable for the EVF 116 and to output the converted video signal (hereinafter referred to as an EVF video signal) or black image signal to the EVF 116 through a bus 122*a*.

Furthermore, the output control unit 135 incorporates a signal generation unit 135A. The signal generation unit 135A performs output control to generate a clock signal and a synchronization signal (a horizontal synchronization signal and a vertical synchronization signal) and to output the signals to the EVF 116 via a bus 122*b*.

Note that the output control unit 134 and the output control unit 135 can output signals independently of each other. In other words, both can output signals at the same time or only one can output a signal.

The control unit 136 includes, for example, a central processing unit (CPU). The control unit 136 controls each unit of the information processing unit 113. Furthermore, the control unit 136 supplies a control signal to the power supply circuit 114, the monitor 115, and the EVF 116 to perform each control.

The power supply circuit 114 is turned on or off under the control of the control unit 136. Furthermore, the power supply circuit 114 controls turning-on, turning-off, and brightness of a light source (backlight) of the monitor 115 by controlling a drive current to be supplied to the monitor 115 under the control of the control unit 136. Moreover, the power supply circuit 114 controls the drive current according to a backlight voltage signal supplied from the monitor 115, and controls turning-on, turning-off, and brightness of the light source of the monitor 115.

The monitor 115 is provided, for example, on a back surface of the imaging apparatus 101, and realizes a monitor function of displaying a video captured by the image sensor 112 on a large screen. The monitor 115 is constituted by a liquid crystal display which is another light-emitting type display device, and includes a liquid crystal panel (hereinafter simply referred to as a panel) which is a display element for displaying a video and the light source for irradiating the panel with the backlight.

The monitor 115 operates in accordance with the clock signal and the synchronization signal supplied from the signal generation unit 134A, and displays a video based on the video signal supplied from the output control unit 134. The panel and the light source of the monitor 115 are individually controlled by the control signal supplied from the control unit 136. In other words, turning-on (ON) and turning-off (OFF) of the panel and light emission (ON) and turning-off (OFF) of the light source are individually controlled. Furthermore, the turning-on and turning-off of the light source and the brightness of the backlight are controlled by the drive current supplied from the power supply circuit 114.

Note that, hereinafter, a state in which the light source of the monitor 115 emits light is referred to as a light-emitting state, and a state in which the light source is turned off is referred to as a non-light-emitting state.

Furthermore, hereinafter, a state in which the panel of the monitor 115 is turned on and the light source thereof emits light is referred to as an activated state. In other words, the activated state is a state in which the monitor 115 operates in the light-emitting state, and is a state in which a video can be displayed.

Hereinafter, a state in which the panel of the monitor 115 is turned on and the light source thereof is turned off is referred to as a standby state. In other words, the standby state is a state in which the monitor 115 operates in the non-light-emitting state, and is a state in which a video cannot be displayed.

Hereinafter, a state in which the panel and the light source of the monitor 115 are turned off is referred to as a stopped state. In other words, the stopped state is a state in which operation of the monitor 115 is stopped in the non-light-emitting state, and is a state in which a video cannot be displayed.

The EVF 116 includes an organic electro luminescence (EL) display that is a self-light-emitting type display device. The EVF 116 operates according to the clock signal and the synchronization signal supplied from the signal generation unit 135A, and displays a video based on the video signal or a black image based on the black image signal supplied from the output control unit 135. The EVF 116 is turned on (ON) or turned off (OFF) by the control signal supplied from the control unit 136.

Note that, hereinafter, a state in which an organic EL element which is a display element of the EVF 116 emits light is referred to as a light-emitting state, and a state in which the organic EL element is turned off is referred to as a non-light-emitting state. The light-emitting state is a state in which the EVF 116 is turned on and a video different from the black image is displayed. The non-light-emitting state is a state in which the EVF 116 is turned on and the black image is displayed, or a state in which the EVF is turned off.

Furthermore, hereinafter, a state in which the EVF 116 is turned on and a video different from the black image is displayed is referred to as an activated state. In other words, the activated state is a state in which the EVF 116 operates in the light-emitting state. Note that the activated state and the light-emitting state of the EVF 116 are similar states.

Hereinafter, a state in which the EVF 116 is turned on and the black image is displayed is referred to as a standby state. In other words, the standby state is a state in which the EVF 116 operates in the non-light-emitting state.

Hereinafter, a state in which the EVF 116 is turned off is referred to as a stopped state. In other words, the stopped state is a state in which operation of the EVF 116 is stopped in the non-light-emitting state, and is a state in which a video cannot be displayed.

Configuration Example of Display Control Unit 151

Figure 2:
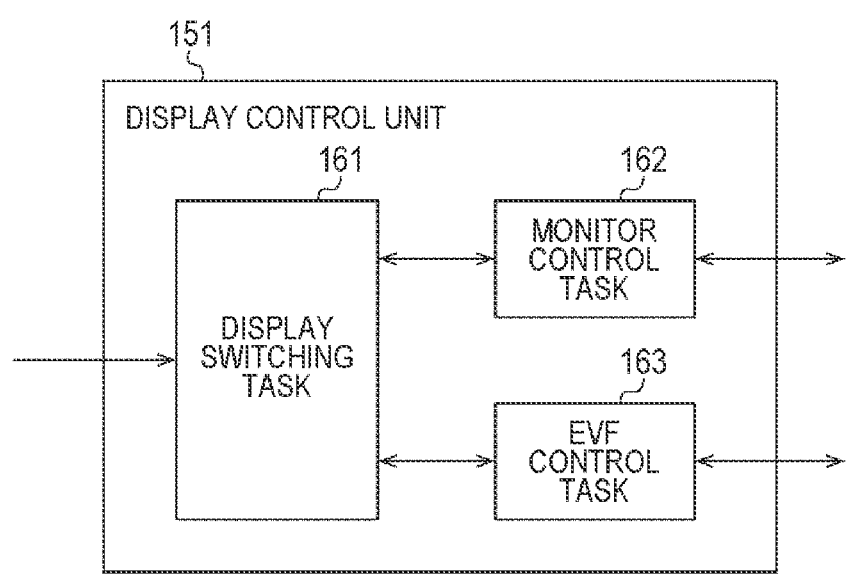
FIG. 2 is a block diagram illustrating a configuration example of a display control unit.

FIG. 2 illustrates a configuration example of a display control unit 151 which is one of functions realized by the control unit 136 of the imaging apparatus 101 in FIG. 1.

The display control unit 151 performs processing of switching a display device that displays a video captured by the image sensor 112. The display control unit 151 includes a display switching task 161, a monitor control task 162, and an EVF control task 163.

The display switching task 161 controls switching of the display device by giving an instruction to the monitor control task 162 and the EVF control task 163 on the basis of a display switching instruction input via an input unit (not illustrated) of the imaging apparatus 101.

The monitor control task 162 controls display of a video by the monitor 115 by controlling the output control unit 134 and the monitor 115.

The EVF control task 163 controls display of a video by the EVF 116 by controlling the switching unit 133, the output control unit 135, and the EVF 116.

First Embodiment of Display Switching Processing

Next, a first embodiment of display switching processing of the imaging apparatus 101 will be described with reference to a flowchart of FIG. 3 and a timing chart of FIG. 4.

Figure 3:
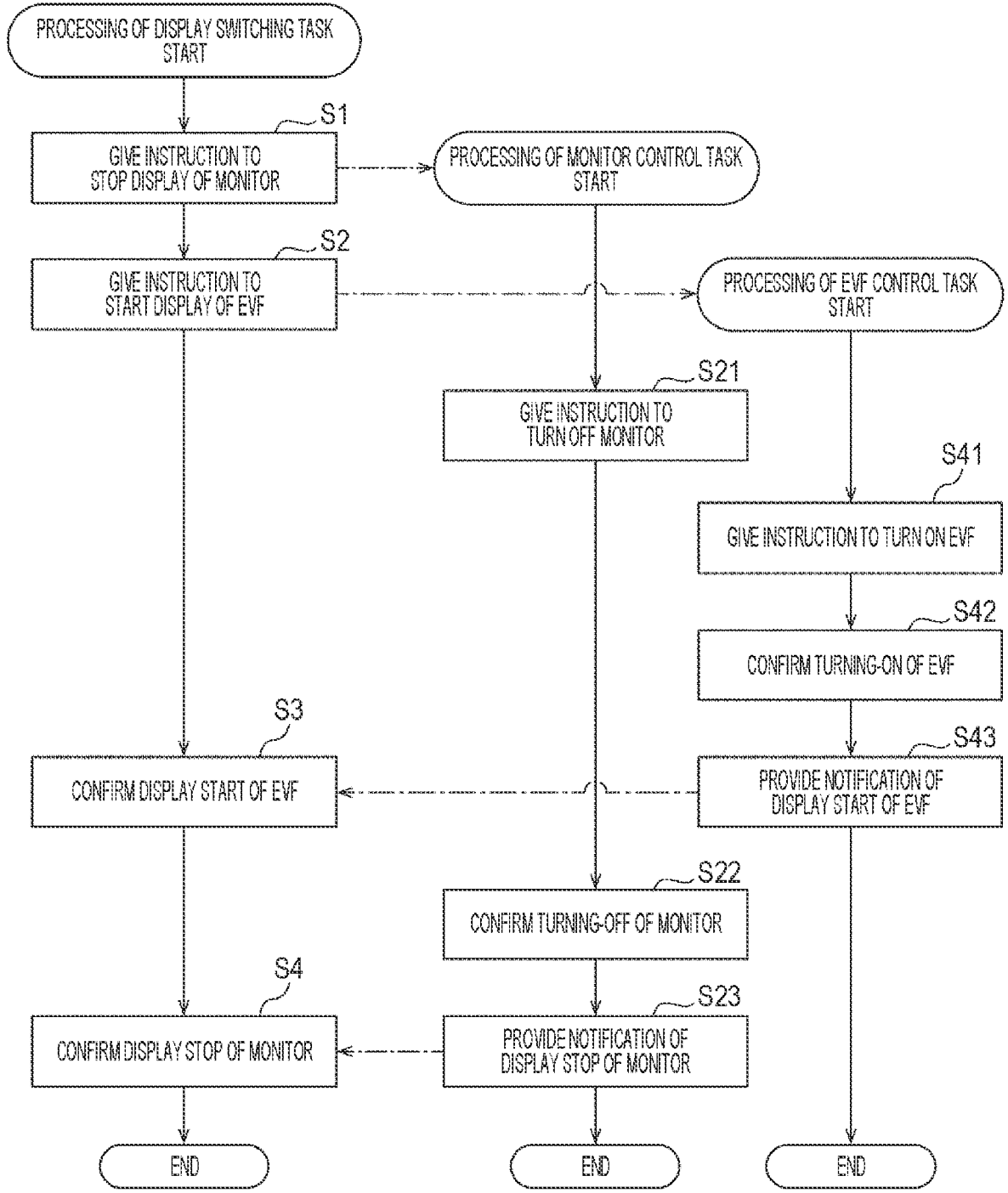
FIG. 3 is a flowchart for explaining a first embodiment of display switching processing of the imaging apparatus in FIG. 1.
Figure 4:
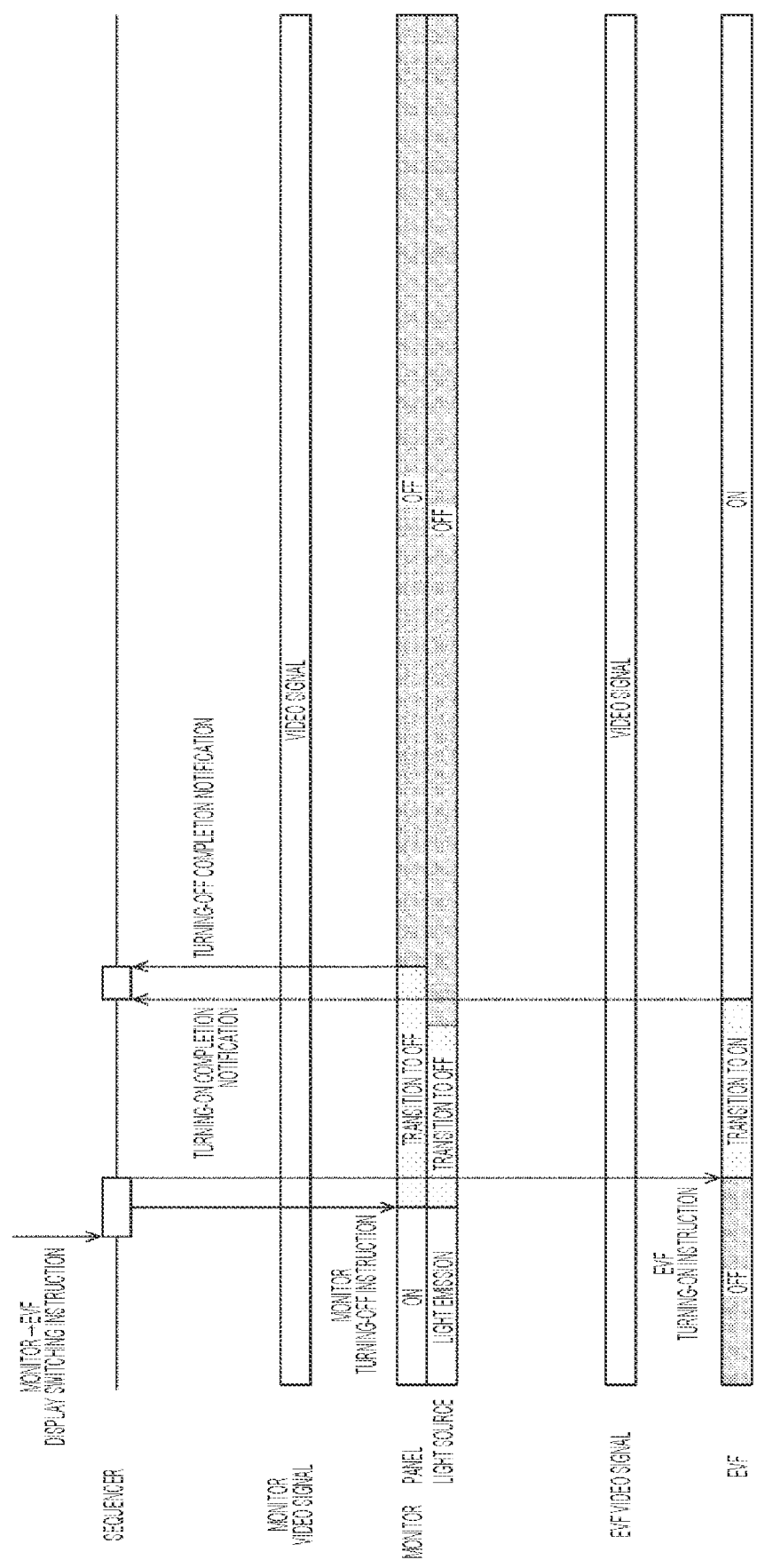
FIG. 4 is a timing chart for explaining the first embodiment of the display switching processing of the imaging apparatus in FIG. 1.

The flowchart of FIG. 3 illustrates a flow of processing of the display switching task 161, the monitor control task 162, and the EVF control task 163 of FIG. 2. The timing chart of FIG. 4 illustrates a timing chart of a sequencer of the control unit 136, a monitor video signal, the panel and the light source of the monitor 115, an EVF video signal, and the EVF 116.

This processing is started, for example, when an instruction to switch display of a video from the monitor 115 to the EVF 116 is input through an input unit (not illustrated).

Note that, in an initial state, it is assumed that the drive current is supplied from the power supply circuit 114 to the monitor 115, the panel of the monitor 115 is turned on, and the light source emits light. Furthermore, it is assumed that a monitor video signal, a clock signal, and a synchronization signal are output from the output control unit 134 to the monitor 115. In other words, it is assumed that the monitor 115 is in an activated state and displays a video based on the monitor video signal.

Moreover, it is assumed that the EVF 116 is turned off and is in a stopped state. Furthermore, it is assumed that the contact of the switching unit 133 is set on the video signal processing unit 131 side, a video signal is supplied from the video signal processing unit 131 to the output control unit 135, and an EVF video signal, a clock signal, and a synchronization signal are output from the output control unit 135 to the EVF 116.

In step S1, the display switching task 161 gives an instruction to stop display of the monitor 115. Specifically, the display switching task 161 generates a display stop command and transmits it to the monitor control task 162.

On the other hand, in step S21, the monitor control task 162 gives an instruction to turn off the monitor 115. Specifically, the monitor control task 162 generates a monitor turning-off command and transmits it to the monitor 115.

On the other hand, the monitor 115 performs processing of turning off the panel and the light source. In other words, the monitor 115 turns off the panel and controls a backlight voltage signal, and performs control to stop the drive current from the power supply circuit 114. Then, when turning-off of the panel and the light source is completed, that is, when the activated state transitions to a stopped state, the monitor 115 generates a turning-off completion command and transmits it to the monitor control task 162. Therefore, the monitor 115 stops display of the video.

On the other hand, in step S22, the monitor control task 162 confirms turning-off of the monitor 115 by receiving the turning-off completion command from the monitor 115.

In step S23, the monitor control task 162 provides notification of display stop of the monitor 115. Specifically, the monitor control task 162 generates a display stop completion command and transmits it to the display switching task 161.

Thereafter, the processing of the monitor control task 162 ends.

On the other hand, in step S4, the display switching task 161 confirms the display stop of the monitor 115 by receiving the display stop completion command from the monitor control task 162.

On the other hand, in step S2, the display switching task 161 gives an instruction to start display of the EVF 116. Specifically, the display switching task 161 generates a display start command and transmits it to the EVF control task 163.

On the other hand, in step S41, the EVF control task 163 gives an instruction to turn on the EVF 116. Specifically, the EVF control task 163 generates an EVF turning-on command and transmits it to the EVF 116.

On the other hand, the EVF 115 performs turning-on processing. Then, when the turning-on is completed, the EVF 116 generates a turning-on completion command and transmits it to the EVF control task 163. Because the EVF video signal has been already supplied to the EVF 116 at this point, the EVF 116 transitions from the stopped state to an activated state, and starts display of a video based on the EVF video signal.

On the other hand, in step S42, the EVF control task 163 confirms turning-on of the EVF 116 by receiving the turning-on completion command from the EVF 116.

In step S43, the EVF control task 163 provides notification of display start of the EVF 116. Specifically, the EVF control task 163 generates a display start completion command and transmits it to the display switching task 161.

Thereafter, the processing of the EVF control task 163 ends.

On the other hand, in step S3, the display switching task 161 confirms the display start of the EVF 116 by receiving the display start completion command from the EVF control task 163.

Then, after the processing in steps S3 and S4 ends, the processing of the display switching task 161 ends.

Note that the processing in steps S21 to S23 and the processing in steps S41 to S43 are performed in parallel. Furthermore, there is a case where timings of the processing in steps S3 and S4 are before or after depending on operation timings of the monitor 115 and the EVF 116, and the like.

As described above, the display of the video is switched from the monitor 115 to the EVF 116. Note that, for example, the EVF 116 performs state transition similar to that of the monitor 115 described above, and the monitor 115 performs state transition similar to that of the EVF 116 described above, whereby the display of the video can be switched from the EVF 116 to the monitor 115.

Furthermore, since the processing of transitioning the monitor 115 from the activated state to the stopped state and the processing of transitioning the EVF 116 from the stopped state to the activated state are performed in parallel, a switching time is shortened. Moreover, since the video signal is continuously supplied to the monitor 115 and the EVF 116 regardless of the states of the monitor 115 and the EVF 116, processing of outputting and stopping the video signal is unnecessary, and the switching time is shortened. Therefore, for example, disadvantage that the display of the EVF 116 is delayed and imaging opportunity is missed and the like is reduced.

Moreover, one of the monitor 115 and the EVF 116 that does not display the video is in the stopped state, so that power consumption can be reduced.

Note that, for example, the output of the monitor video signal from the output control unit 134 may be stopped while the monitor 115 is turned off, and the output of the EVF video signal from the output control unit 135 may be stopped while the EVF 116 is turned off. Therefore, power consumption and unnecessary radiation can be reduced.

Second Embodiment of Display Switching Processing

Next, a second embodiment of display switching processing of the imaging apparatus 101 will be described with reference to a flowchart of FIG. 5 and a timing chart of FIG. 6.

Figure 5:
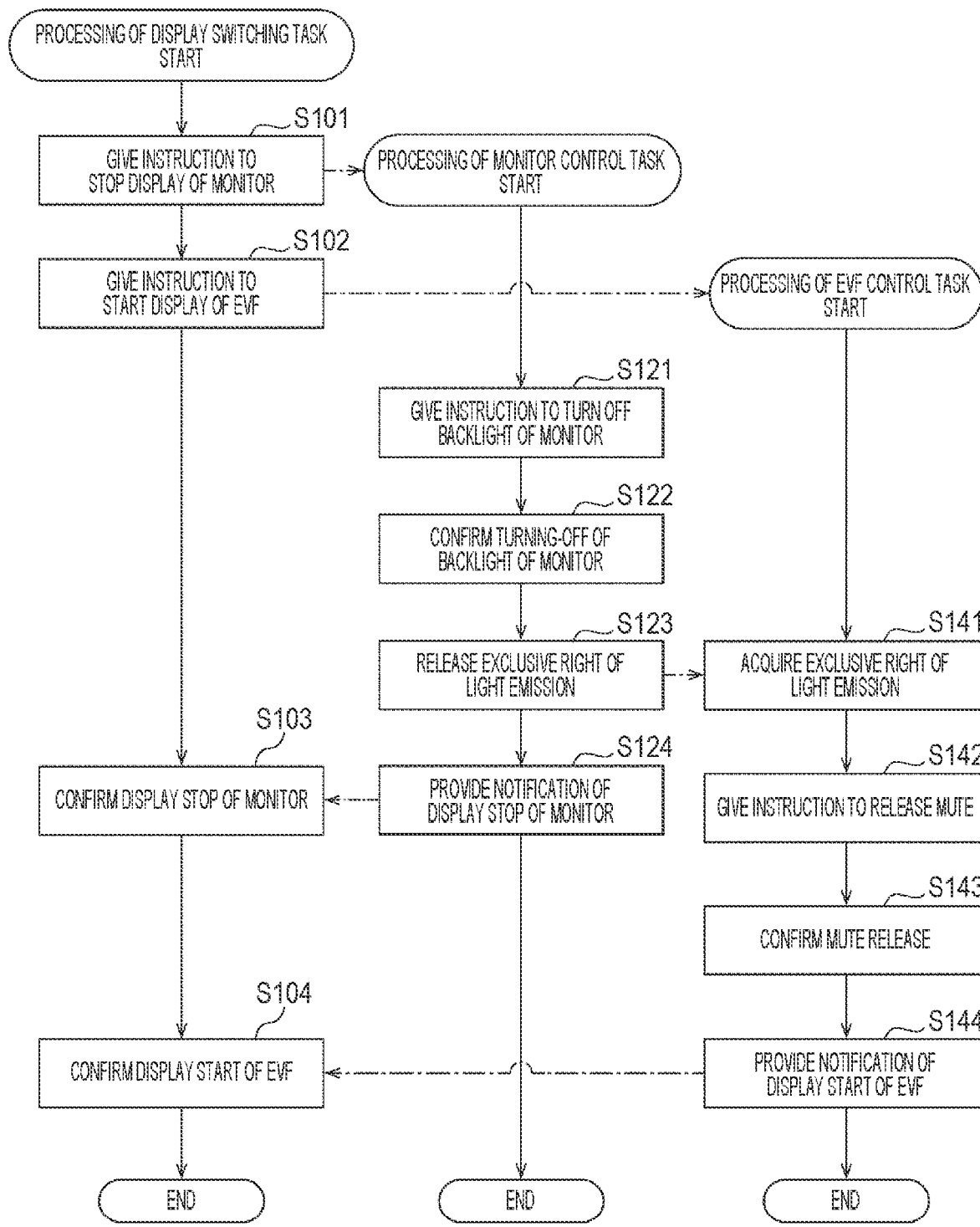
FIG. 5 is a flowchart for explaining a second embodiment of display switching processing of the imaging apparatus in FIG. 1.
Figure 6:
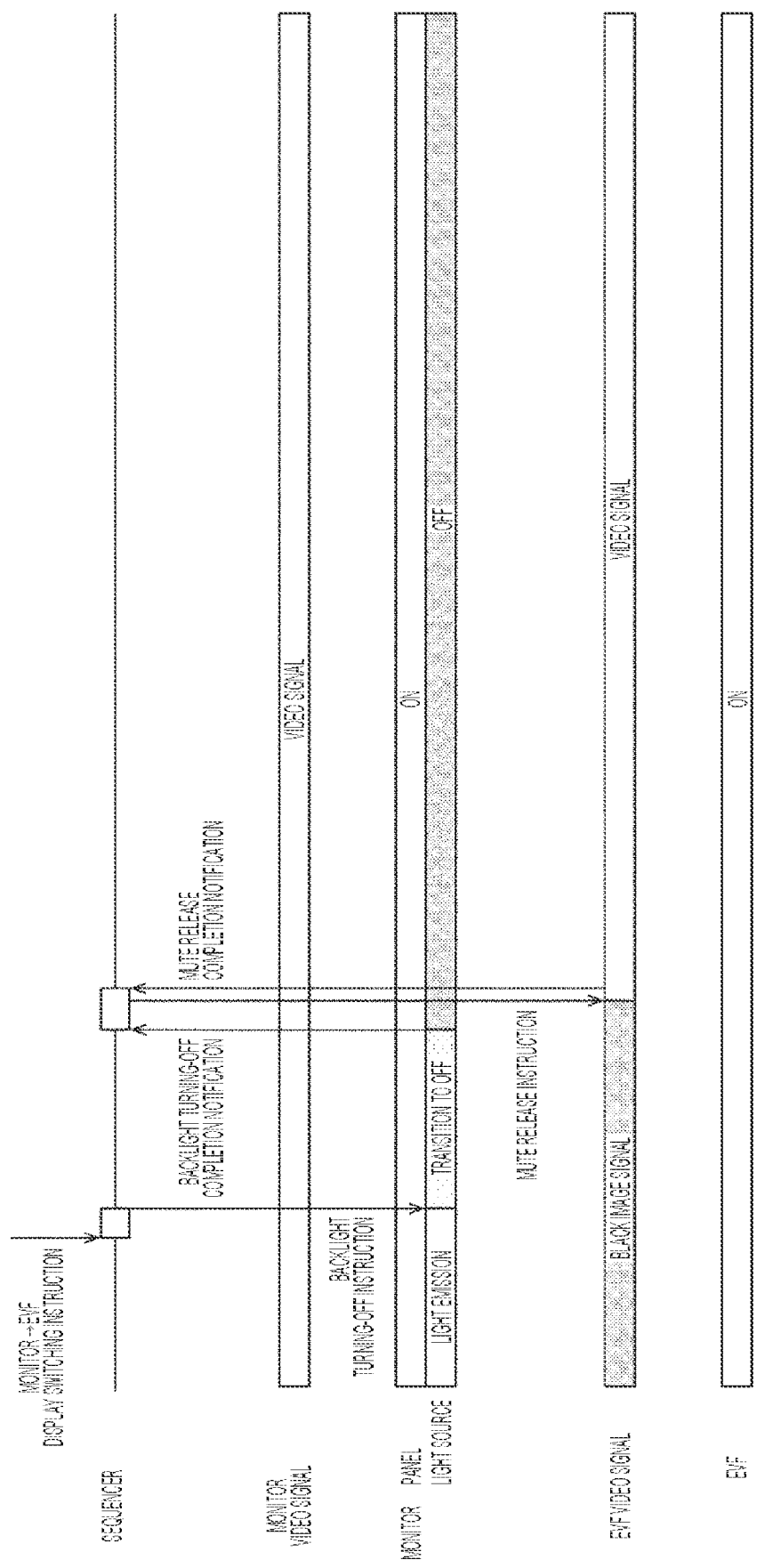
FIG. 6 is a timing chart for explaining the second embodiment of the display switching processing of the imaging apparatus in FIG. 1.

The flowchart of FIG. 5 illustrates a flow of processing of the display switching task 161, the monitor control task 162, and the EVF control task 163 of FIG. 2. The timing chart of FIG. 6 illustrates a timing chart of the sequencer of the control unit 136, the monitor video signal, the panel and the light source of monitor 115, the EVF video signal, and the EVF 116.

This processing is started, for example, when an instruction to switch display of a video from the monitor 115 to the EVF 116 is input through an input unit (not illustrated).

Note that, in an initial state, similarly to the first embodiment, it is assumed that the monitor 115 is in an activated state and displays a video based on the monitor video signal. Furthermore, it is assumed that the EVF 116 is turned on. Moreover, it is assumed that the contact of the switching unit 133 is set on the black image signal generation unit 132 side, a black image signal is supplied from the black image signal generation unit 132 to the output control unit 135, and the black image signal, a clock signal, and a synchronization signal are output from the output control unit 135 to the EVF 116. In other words, it is assumed that the EVF 116 is in a standby state, and displays a black image based on the black image signal.

Moreover, it is assumed that the monitor control task 162 has acquired an exclusive right of light emission. The exclusive right of light emission is for performing exclusive control of light emission of the monitor 115 and light emission of the EVF 116, and a task acquiring the exclusive right of light emission can control a light-emitting state. In this case, since the monitor control task 162 has acquired the exclusive right of light emission, the monitor control task 162 can control a light-emitting state of the monitor 115, but the EVF control task 163 cannot control a light-emitting state of the EVF 116.

In step S101, similarly to the processing in step S1 of FIG. 3, the display switching task 161 instructs the monitor control task 162 to stop display of the monitor 115.

On the other hand, in step S121, the monitor control task 162 gives an instruction to turn off the backlight of the monitor 115. Specifically, the monitor control task 162 generates a backlight turning-off command and transmits it to the monitor 115.

On the other hand, the monitor 115 performs processing of turning off the light source. In other words, the monitor 115 controls a backlight voltage signal, and performs control to stop a drive current from the power supply circuit 114. Then, when the turning-off of the light source (backlight) is completed, that is, when the activated state transitions to a standby state, the monitor 115 generates a backlight turning-off completion command and transmits it to the monitor control task 162. Therefore, the monitor 115 stops display of the video.

On the other hand, in step S122, the monitor control task 162 confirms the turning-off of the backlight of the monitor 115 by receiving the backlight turning-off completion command from the monitor 115.

In step S123, the monitor control task 162 releases the exclusive right of light emission.

In step S124, similarly to the processing in step S23 in FIG. 3, the monitor control task 162 notifies the display switching task 161 of display stop of the monitor 115.

Thereafter, the processing of the monitor control task 162 ends.

On the other hand, in step S103, similarly to the processing in step S4 of FIG. 3, the display switching task 161 confirms display stop of the monitor 115.

On the other hand, in step S102, similarly to the processing in step S2 of FIG. 3, the display switching task 161 instructs the EVF control task 163 to start display of the EVF 116.

On the other hand, the EVF control task 163 waits until the exclusive right of light emission is released, and acquires the exclusive right of light emission in step S141 when the exclusive right of light emission is released in the processing in step S123.

In step S142, the EVF control task 163 gives an instruction to release a mute. Specifically, the EVF control task 163 generates a mute release instructing command, and transmits it to the switching unit 133.

On the other hand, the switching unit 133 switches the contact from the black image signal generation unit 132 side to the video signal processing unit 131 side. Therefore, supply of a video signal from the video signal processing unit 131 to the output control unit 135 is started, and output of an EVF video signal from the output control unit 135 to the EVF 116 is started. As a result, display of the EVF 116 is switched from the black image to a video based on the EVF video signal. In other words, the EVF 116 transitions from the standby state to an activated state. This state transition is performed almost immediately because the contact of the switching unit 133 is only switched.

Then, when switching the contact from the black image signal generation unit 132 side to the video signal processing unit 131 side, the switching unit 133 generates a mute release completion command for notifying that the mute release is completed, and transmits the command to the EVF control task 163.

On the other hand, in step S143, the EVF control task 163 confirms the mute release by receiving the mute release completion command from the switching unit 133.

In step S144, similarly to the processing in step S43 of FIG. 3, the EVF control task 163 notifies the display switching task 161 of display start of the EVF 116.

Thereafter, the processing of the EVF control task 163 ends.

On the other hand, in step S104, similarly to the processing in step S3 of FIG. 3, the display switching task 161 confirms the display start of the EVF 116.

Thereafter, the processing of the display switching task 161 ends.

As described above, the display of the video is switched from the monitor 115 to the EVF 116. Note that, for example, the EVF 116 performs state transition similar to that of the monitor 115 described above, and the monitor 115 performs state transition similar to that of the EVF 116 described above, whereby the display of the video can be switched from the EVF 116 to the monitor 115.

Furthermore, since the EVF 116 transitions from the standby state to the activated state after the monitor 115 transitions from the activated state to the standby state by exclusive control, the monitor 115 and the EVF 116 are prevented from simultaneously emitting light. Therefore, a peak of power consumption can be suppressed, and a load of a power supply circuit (including the power supply circuit 114) of the imaging apparatus 101 can be reduced. As a result, it is possible to reduce the size and cost of the power supply circuit.

Moreover, since both the monitor 115 and the EVF 116 transition between the activated state and the standby state, a transition time can be shortened as compared with a case of transition between the activated state and the stopped state. As a result, a switching time of the display of the video is shortened.

Third Embodiment of Display Switching Processing

Next, a third embodiment of display switching processing of the imaging apparatus 101 will be described with reference to a flowchart of FIG. 7 and a timing chart of FIG. 8.

Figure 7:
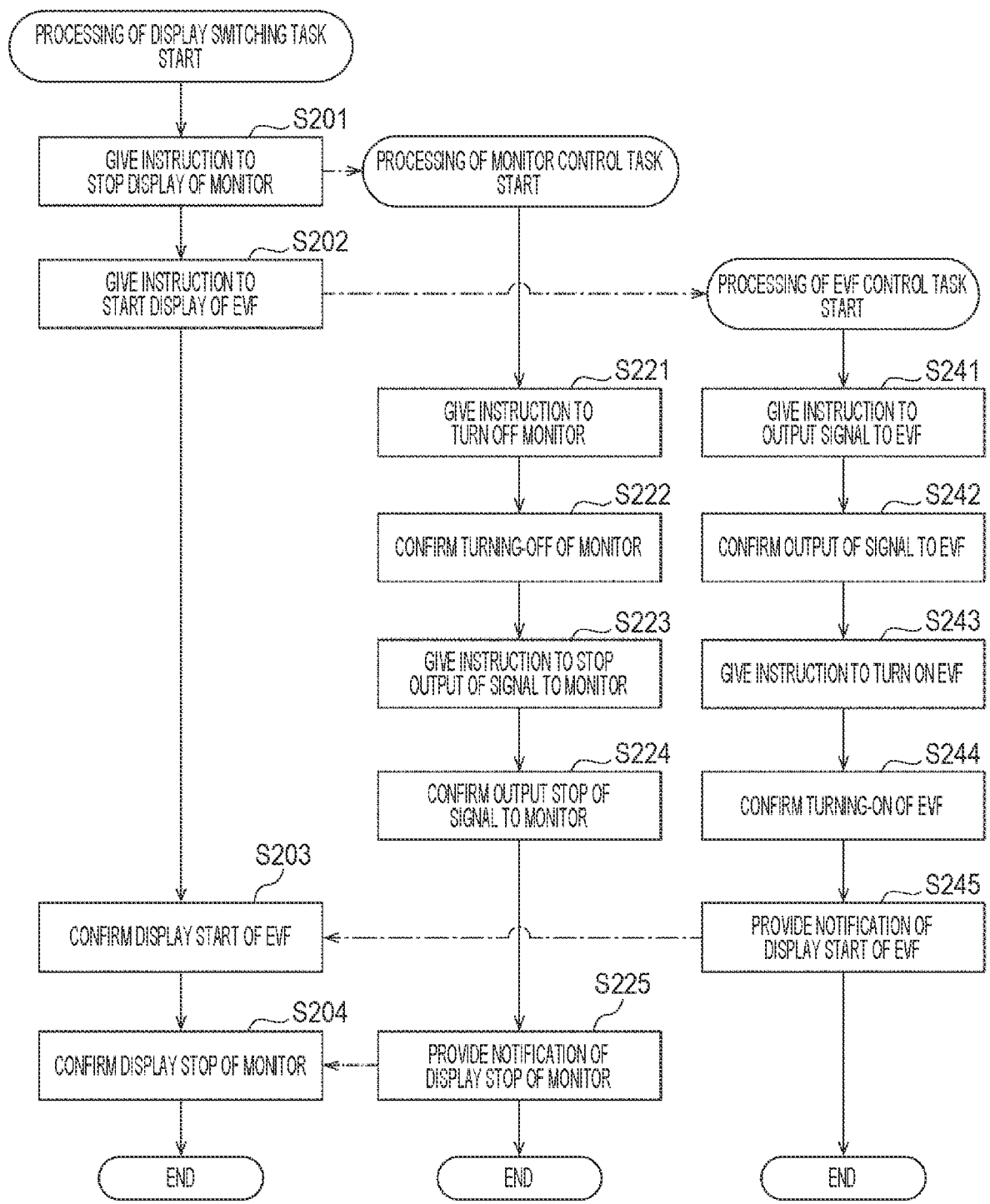
FIG. 7 is a flowchart for explaining a third embodiment of the display switching processing of the imaging apparatus in FIG. 1.
Figure 8:
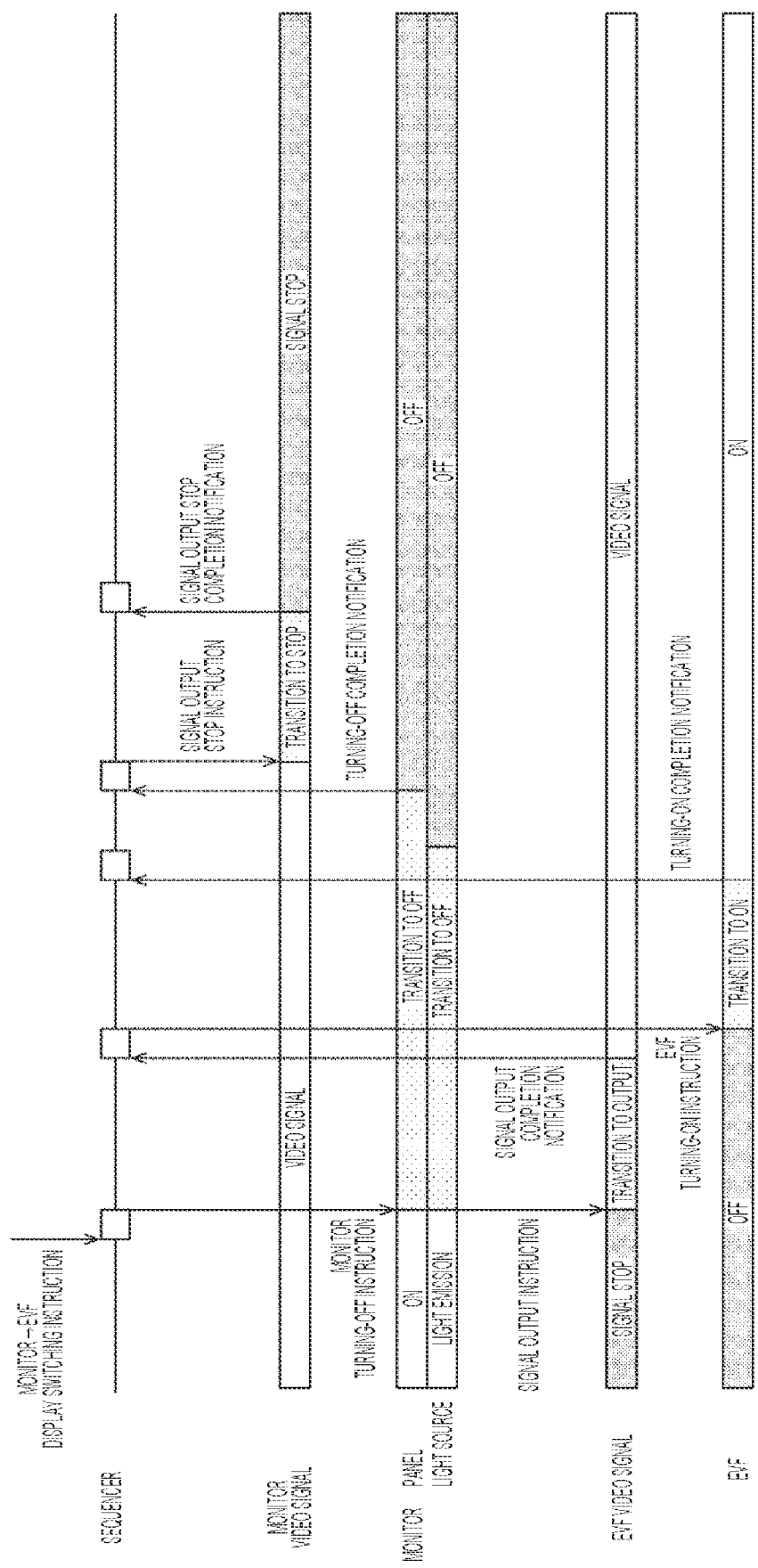
FIG. 8 is a timing chart for explaining the third embodiment of the display switching processing of the imaging apparatus in FIG. 1.

The flowchart of FIG. 7 illustrates a flow of processing of the display switching task 161, the monitor control task 162, and the EVF control task 163 of FIG. 2. The timing chart of FIG. 8 illustrates a timing chart of the sequencer of the control unit 136, the monitor video signal, the panel and the light source of monitor 115, the EVF video signal, and the EVF 116.

This processing is started, for example, when an instruction to switch display of a video from the monitor 115 to the EVF 116 is input through an input unit (not illustrated) and the display switching task 161 is activated.

Note that, in an initial state, similarly to the first embodiment, it is assumed that the monitor 115 is in an activated state and displays a video based on the monitor video signal.

Furthermore, it is assumed that the EVF 116 is turned off and is in a stopped state. Moreover, it is assumed that the contact of the switching unit 133 is set on the video signal processing unit 131 side, and a video signal is supplied from the video signal processing unit 131 to the output control unit 135, but the signal is not output from the output control unit 135 to the EVF 116.

In step S201, similarly to the processing in step S1 of FIG. 3, the display switching task 161 instructs the monitor control task 162 to stop display of the monitor 115.

On the other hand, in step S221, similarly to the processing in step S21 of FIG. 3, an instruction on turning-off of the monitor 115 is given. Therefore, the monitor 115 transitions from the activated state to a stopped state, and stops display of the video.

In step S222, similarly to the processing in step S22 in FIG. 3, the turning-off of the monitor 115 is confirmed.

In step S223, the monitor control task 162 gives an instruction to stop output of a signal to the monitor 115. Specifically, the monitor control task 162 generates a signal output stop command and transmits it to the output control unit 134.

On the other hand, the output control unit 134 stops output of the monitor video signal, the clock signal, and the synchronization signal. Then, when the output of each signal is stopped, the output control unit 134 generates a signal output stop completion command and transmits it to the monitor control task 162.

On the other hand, in step S224, the monitor control task 162 confirms output stop of the signal to the monitor 115 by receiving the signal output stop completion command from the output control unit 134.

In step S225, similarly to the processing in step S23 of FIG. 3, the monitor control task 162 notifies the display switching task 161 of display stop of the monitor 115.

Thereafter, the processing of the monitor control task 162 ends.

On the other hand, in step S204, similarly to the processing of step S4 in FIG. 3, the display switching task 161 confirms the display stop of the monitor 115.

On the other hand, in step S202, similarly to the processing in step S2 of FIG. 3, the display switching task 161 instructs the EVF control task 163 to start display of the EVF 116.

On the other hand, in step S241, the EVF control task 163 gives an instruction to output a signal to the EVF 116. Specifically, the EVF control task 163 generates a signal output command and transmits it to the output control unit 135.

On the other hand, the output control unit 135 starts output of the EVF video signal, the clock signal, and the synchronization signal. However, since the EVF 116 is not turned on, a video is not displayed on the EVF 116. Then, when the output of each signal is started, the output control unit 135 generates a signal output completion command and transmits it to the EVF control task 163.

On the other hand, in step S242, the EVF control task 163 confirms the output of the signal to the EVF 116 by receiving the signal output completion command from the output control unit 135.

In step S243, similarly to the processing in step S41 in FIG. 3, an instruction on turning-on of the EVF 116 is given. Therefore, the EVF 116 is turned on, and display of a video based on the EVF video signal is started. In other words, the EVF 116 transitions from the stopped state to an activated state.

In step S244, similarly to the processing in step S42 in FIG. 3, turning-on of the EVF 116 is confirmed.

In step S245, similarly to the processing in step S43 in FIG. 3, the EVF control task 163 notifies the display switching task 161 of display start of the EVF 116.

Thereafter, the processing of the EVF control task 163 ends.

On the other hand, in step S203, similarly to the processing in step S3 in FIG. 3, the display switching task 161 confirms the display start of the EVF 116.

Then, after the processing in steps S203 and S204 ends, the processing of the display switching task 161 ends.

Note that the processing in steps S221 to S225 and the processing in steps S241 to S245 are performed in parallel. Furthermore, there is a case where timings of the processing in steps S203 and S204 are before or after depending on operation timings of the monitor 115 and the EVF 116, and the like.

As described above, the display of the video is switched from the monitor 115 to the EVF 116. Note that, for example, the EVF 116 performs state transition similar to that of the monitor 115 described above, and the monitor 115 performs state transition similar to that of the EVF 116 described above, whereby the display of the video can be switched from the EVF 116 to the monitor 115.

Furthermore, since the processing of transitioning the monitor 115 from the activated state to the stopped state and the processing of transitioning the EVF 116 from the stopped state to the activated state are performed in parallel, a switching time is shortened.

Moreover, the output of the video signal to one of the monitor 115 and the EVF 116 that does not display the video is stopped, so that power consumption can be reduced.

Fourth Embodiment of Display Switching Processing

Next, a fourth embodiment of display switching processing of the imaging apparatus 101 will be described with reference to a flowchart of FIG. 9 and a timing chart of FIG. 10.

Figure 9:
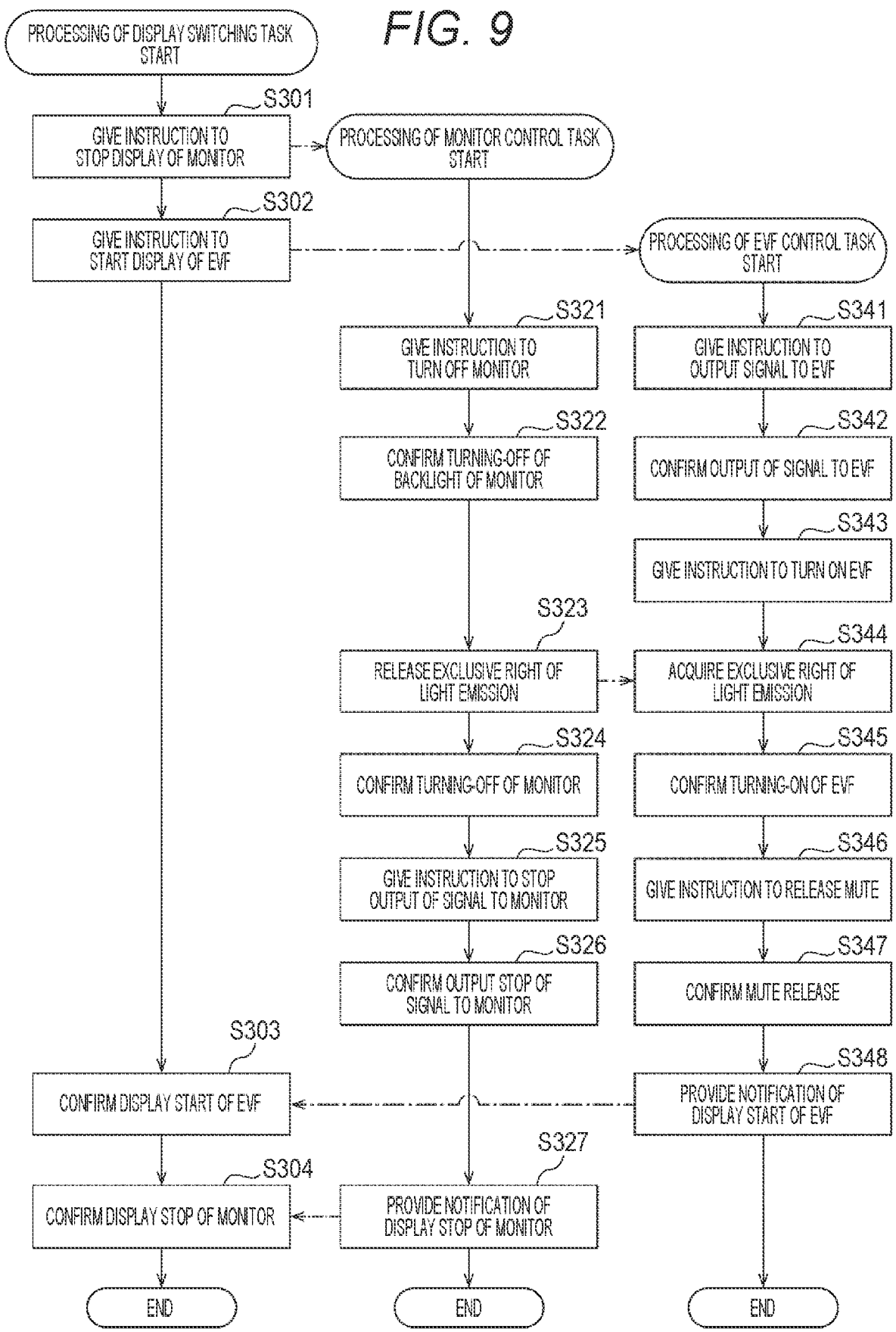
FIG. 9 is a flowchart for explaining a fourth embodiment of the display switching processing of the imaging apparatus in FIG. 1.
Figure 10:
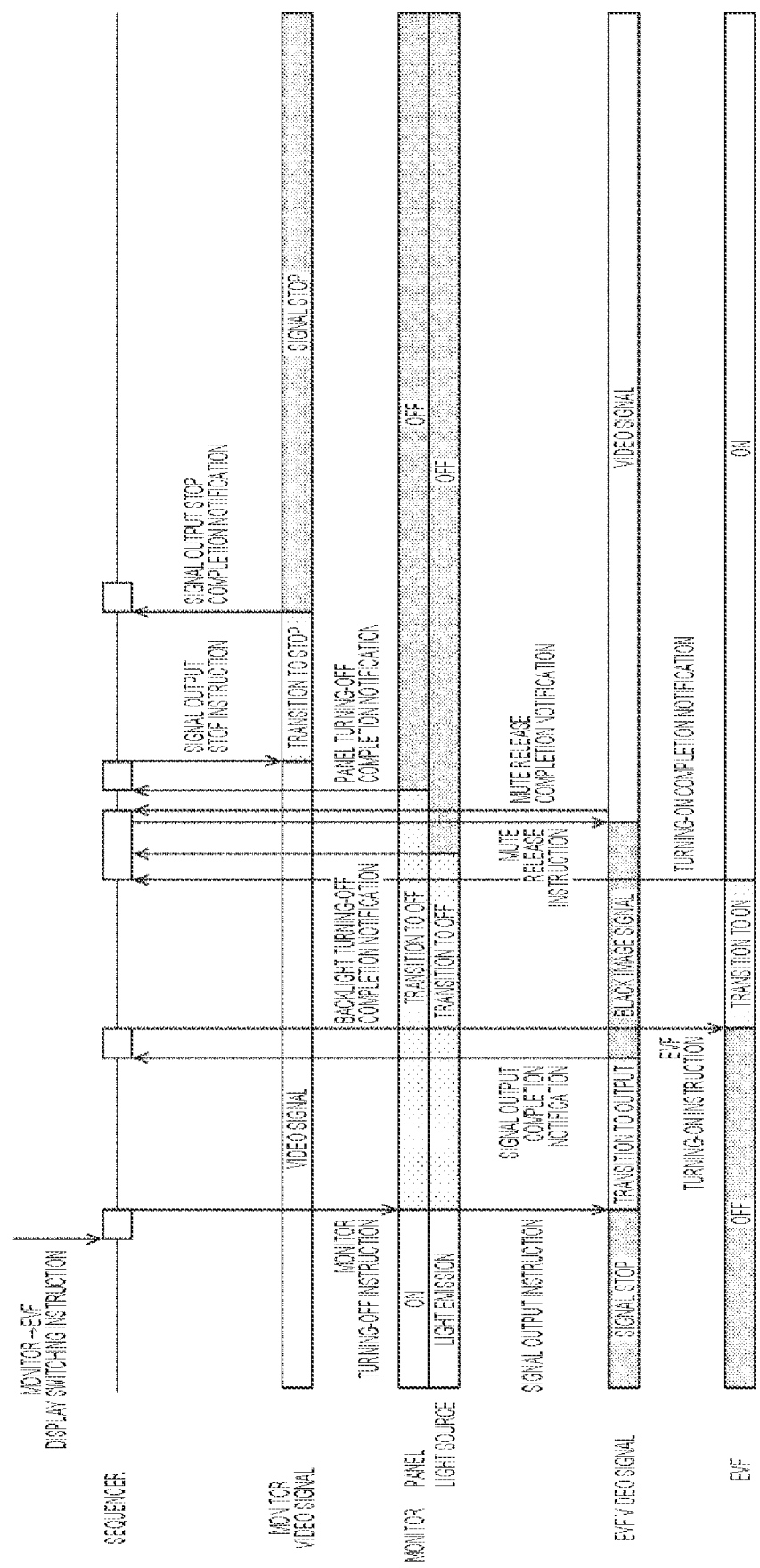
FIG. 10 is a timing chart for explaining the fourth embodiment of the display switching processing of the imaging apparatus in FIG. 1.

The flowchart of FIG. 9 illustrates a flow of processing of the display switching task 161, the monitor control task 162, and the EVF control task 163 of FIG. 2. The timing chart of FIG. 10 illustrates a timing chart of the sequencer of the control unit 136, the monitor video signal, the panel and the light source of the monitor 115, the EVF video signal, and the EVF 116.

This processing is started, for example, when an instruction to switch display of a video from the monitor 115 to the EVF 116 is input through an input unit (not illustrated).

Note that, in an initial state, similarly to the first embodiment, it is assumed that the monitor 115 is in an activated state and displays a video based on the monitor video signal.

Furthermore, it is assumed that the EVF 116 is turned off and is in a stopped state. Moreover, it is assumed that the contact of the switching unit 133 is set on the black image signal generation unit 132 side, a black image signal is supplied from the black image signal generation unit 132 to the output control unit 135, and no signal is output from the output control unit 135.

Moreover, it is assumed that the monitor control task 162 has acquired an exclusive right of light emission.

In step S301, similarly to the processing in step S1 of FIG. 3, the display switching task 161 instructs the monitor control task 162 to stop display of the monitor 115.

On the other hand, in step S321, similarly to the processing in step S21 of FIG. 3, an instruction on turning-off of the monitor 115 is given.

On the other hand, the monitor 115 performs processing of turning off the panel and the light source similarly to the processing in step S21 of FIG. 3. Then, when the turning-off of the light source (backlight) is completed, that is, when the activated state transitions to a standby state, the monitor 115 generates a backlight turning-off completion notification and transmits it to the monitor control task 162. Therefore, the monitor 115 stops display of the video.

On the other hand, in step S322, the monitor control task 162 confirms turning-off of the backlight of the monitor 115 by receiving a backlight turning-off completion command from the monitor 115.

In step S323, the monitor control task 162 releases the exclusive right of light emission.

Furthermore, when turning-off of the panel is completed, that is, when the standby state transitions to a stopped state, the monitor 115 generates a panel turning-off completion notification and transmits it to the monitor control task 162.

On the other hand, in step S324, the monitor control task 162 confirms turning-off of the panel of the monitor 115 by receiving a panel turning-off completion command from the monitor 115.

In step S325, similarly to the processing in step S223 in FIG. 7, an instruction on output stop of the signal to the monitor 115 is given. Therefore, output of the signal from the output control unit 134 to the monitor 115 is stopped.

In step S326, similarly to the processing in step S224 in FIG. 7, the output stop of the signal to the monitor 115 is confirmed.

In step S327, similarly to the processing in step S23 in FIG. 3, the monitor control task 162 notifies the display switching task 161 of display stop of the monitor 115.

Thereafter, the processing of the monitor control task 162 ends.

On the other hand, in step S304, similarly to the processing in step S4 in FIG. 3, the display switching task 161 confirms the display stop of the monitor 115.

On the other hand, in step S302, similarly to the processing in step S2 in FIG. 3, the display switching task 161 instructs the EVF control task 163 to start display of the EVF 116.

On the other hand, in step S341, similarly to the processing in step S241 of FIG. 7, an instruction on output of the signal to the EVF 116 is given. Therefore, the output control unit 135 starts output of a black image signal, a clock signal, and a synchronization signal to the EVF 116. However, since the EVF 116 is not turned on, the black image is not displayed on the EVF 116.

In step S342, the output of the signal to the EVF 116 is confirmed similarly to the processing in step S242 of FIG. 7.

In step S343, similarly to the processing in step S41 of FIG. 3, an instruction on turning-on of the EVF 116 is given.

Thereafter, the EVF control task 163 waits until the exclusive right of light emission is released, and acquires the exclusive right of light emission in step S344 when the exclusive right of light emission is released in the processing in step S323.

In step S345, similarly to the processing in step S42 of FIG. 3, the turning-on of the EVF 116 is confirmed. Note that, by turning on the EVF 116, the EVF 115 displays the black image and transitions from the stopped state to a standby state.

Note that there is a case where the processing in step S344 and the processing in step S345 are performed before or after depending on operation timings of the monitor 115 and the EVF 116, and the like.

In step S346, similarly to the processing in step S142 of FIG. 5, an instruction on mute release is given.

On the other hand, supply of a video signal from the video signal processing unit 131 to the output control unit 135 is started, and output of an EVF video signal from the output control unit 135 to the EVF 116 is started. Then, the EVF 116 starts display of a video based on the EVF video signal. Therefore, the EVF 116 transitions from the standby state to an activated state.

In step S347, the mute release is confirmed similarly to the processing in step S143 of FIG. 5.

In step S348, similarly to the processing in step S43 of FIG. 3, the EVF control task 163 notifies the display switching task 161 of display start of the EVF 116.

Thereafter, the processing of the EVF control task 163 ends.

On the other hand, in step S303, similarly to the processing in step S3 of FIG. 3, the display switching task 161 confirms the display start of the EVF 116.

Then, after the processing in steps S303 and S304 ends, the processing of the display switching task 161 ends.

Note that there is a case where timings of the processing in steps S303 and S304 are before or after depending on operation timings of the monitor 115 and the EVF 116, and the like.

As described above, the display of the video is switched from the monitor 115 to the EVF 116. Note that, for example, the EVF 116 performs state transition similar to that of the monitor 115 described above, and the monitor 115 performs state transition similar to that of the EVF 116 described above, whereby the display of the video can be switched from the EVF 116 to the monitor 115.

Furthermore, since the processing of transitioning the monitor 115 from the activated state to the stopped state and the processing of transitioning the EVF 116 from the stopped state to the activated state are performed in parallel, a switching time is shortened.

Furthermore, since the EVF 116 transitions from the standby state to the activated state after the monitor 115 transitions from the activated state to the standby state or the stopped state by the exclusive control, the monitor 115 and the EVF 116 are prevented from simultaneously emitting light. Therefore, a peak of power consumption can be suppressed, and a load of a power supply circuit (including the power supply circuit 114) of the imaging apparatus 101 can be reduced. As a result, it is possible to reduce the size and cost of the power supply circuit.

Fifth Embodiment of Display Switching Processing

Next, a fifth embodiment of display switching processing of the imaging apparatus 101 will be described with reference to a flowchart of FIG. 11 and a timing chart of FIG. 12.

Figure 11:
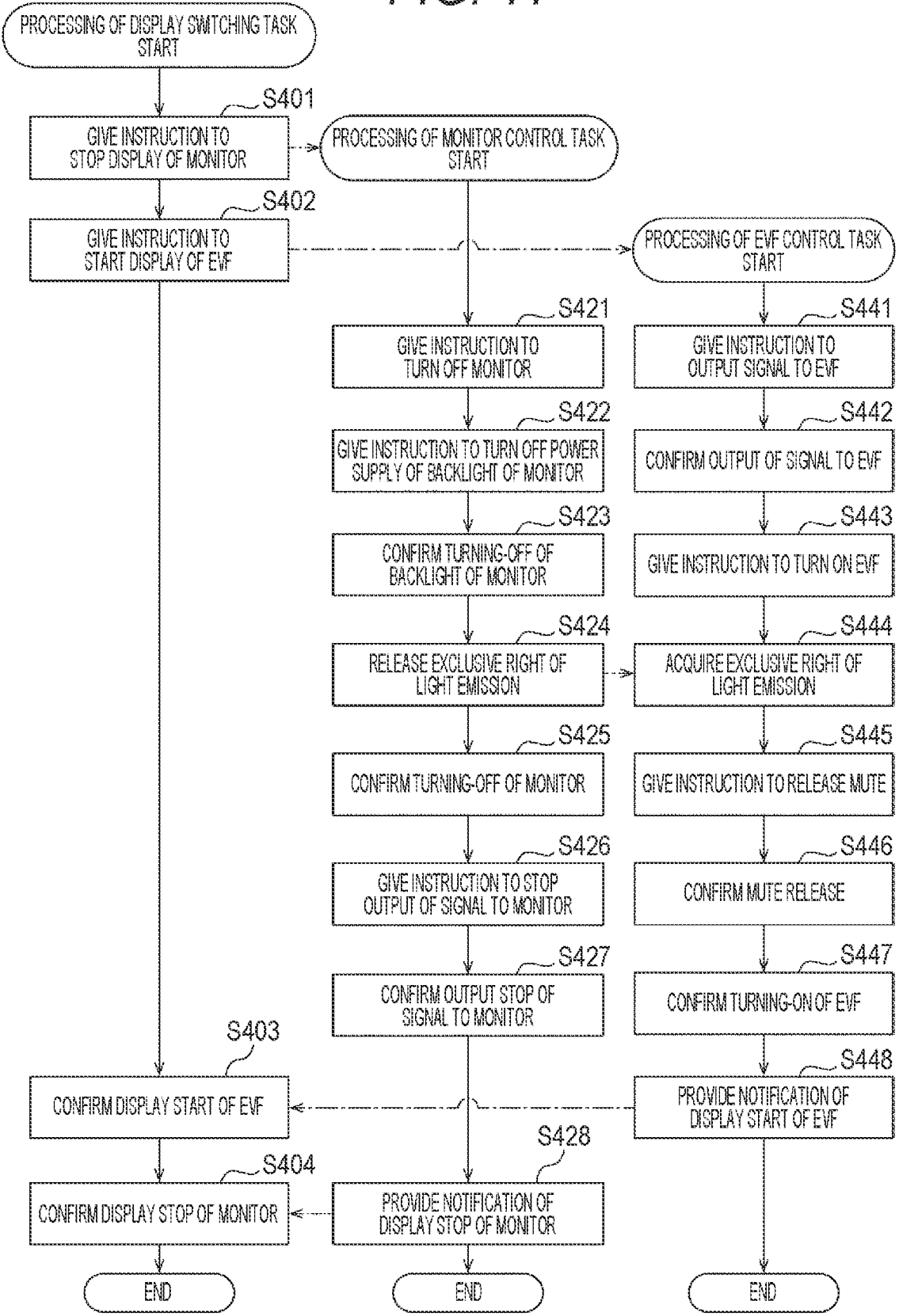
FIG. 11 is a flowchart for explaining a fifth embodiment of the display switching processing of the imaging apparatus in FIG. 1.
Figure 12:
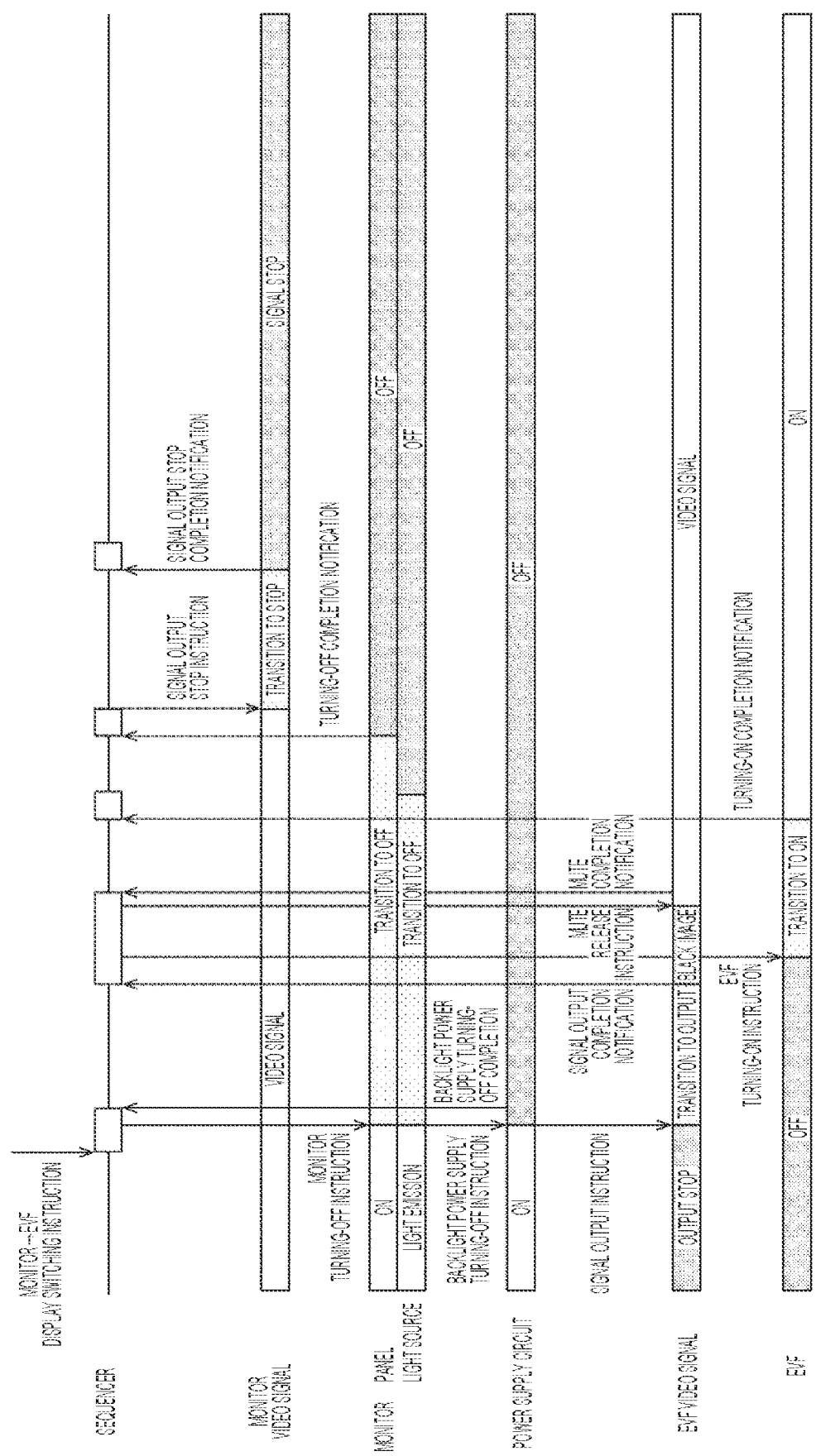
FIG. 12 is a timing chart for explaining the fifth embodiment of the display switching processing of the imaging apparatus in FIG. 1.

The flowchart of FIG. 11 illustrates a flow of processing of the display switching task 161, the monitor control task 162, and the EVF control task 163 of FIG. 2. The timing chart of FIG. 12 illustrates a timing chart of the sequencer of the control unit 136, the monitor video signal, the panel and the light source of the monitor 115, the power supply circuit 114, the EVF video signal, and the EVF 116.

This processing is started, for example, when an instruction to switch display of a video from the monitor 115 to the EVF 116 is input through an input unit (not illustrated).

Note that an initial state is similar to that of the fourth embodiment.

In step S401, similarly to the processing in step S1 of FIG. 3, the display switching task 161 instructs the monitor control task 162 to stop display of the monitor 115.

On the other hand, in step S421, similarly to the processing in step S21 of FIG. 3, an instruction on turning-off of the monitor 115 is given.

On the other hand, the monitor 115 starts processing of turning off the panel and the light source similarly to the processing in step S21 of FIG. 3.

In step S422, the monitor control task 162 gives an instruction to turn off a power supply of the backlight of the monitor 115. Specifically, the monitor control task 162 generates a backlight power supply turning-off command and transmits it to the power supply circuit 114.

On the other hand, the power supply circuit 114 is turned off, and supply of a drive current to the monitor 115 is forcibly stopped. Therefore, the light source (backlight) of the monitor 115 is turned off, and the monitor 115 transitions from the activated state to a standby state and stops display of the video.

Note that a time required to turn off the power supply circuit 114 is shorter than a time required to turn off the light source by issuing an instruction to the monitor 115. Therefore, the light source of the monitor 115 is turned off more quickly, and the monitor 115 is brought into a non-light-emitting state more quickly.

Then, the power supply circuit 114 generates a backlight power supply turning-off completion command and transmits it to the monitor control task 162.

On the other hand, in step S423, the monitor control task 162 confirms turning-off of the backlight of the monitor 115 by receiving the backlight power supply turning-off completion command from the power supply circuit 114.

In step S424, the monitor control task 162 releases an exclusive right of light emission.

Thereafter, processing similar to that in steps S324 to S327 in FIG. 9 is performed in steps S425 to S428, and the processing of the monitor control task 162 ends.

Then, in step S404, similarly to the processing in step S4 of FIG. 3, the display switching task 161 confirms display stop of the monitor 115.

On the other hand, in step S402, similarly to the processing in step S2 in FIG. 3, the display switching task 161 instructs the EVF control task 163 to start display of the EVF 116.

On the other hand, processing similar to that in steps S341 to S344 in FIG. 9 is performed in steps S441 to S444.

In step S445, similarly to the processing in step S142 of FIG. 5, an instruction on mute release is given. Therefore, supply of a video signal from the video signal processing unit 131 to the output control unit 135 is started, and output of an EVF video signal from the output control unit 135 to the EVF 116 is started.

In step S446, the mute release is confirmed similarly to the processing in step S143 of FIG. 5.

In step S447, similarly to the processing in step S42 of FIG. 3, turning-on of the EVF 116 is confirmed. Note that, by turning on the EVF 116, the EVF 116 displays a video based on the EVF video signal and transitions to an activated state.

In step S448, similarly to the processing in step S43 of FIG. 3, the EVF control task 163 notifies the display switching task 161 of display start of the EVF 116.

Thereafter, the processing of the EVF control task 163 ends.

On the other hand, in step S403, similarly to the processing in step S3 of FIG. 3, the display switching task 161 confirms the display start of the EVF 116.

Then, after the processing in steps S403 and S404 ends, the processing of the display switching task 161 ends.

Note that there is a case where timings of the processing in steps S403 and S404 are before or after depending on operation timings of the monitor 115 and the EVF 116, and the like.

As described above, the display of the video is switched from the monitor 115 to the EVF 116. Note that, for example, the EVF 116 performs state transition similar to that of the monitor 115 described above, and the monitor 115 performs state transition similar to that of the EVF 116 described above, whereby the display of the video can be switched from the EVF 116 to the monitor 115.

Furthermore, in the fifth embodiment, it is possible to shorten the switching time of the display of the video as compared with the fourth embodiment. Specifically, in a case where the monitor control task 162 instructs the monitor 115 to turn off the light source, the monitor 115 needs to control the drive current of the power supply circuit 114 using a backlight voltage signal. On the other hand, by directly instructing the power supply circuit 114 from the monitor control task 162 to turn off the power supply circuit 114, the light source of the monitor 115 can be turned off more quickly. As a result, the monitor 115 can more be quickly transitioned to the non-light-emitting state, and the EVF 116 can be more quickly transitioned to the activated state (light-emitting state).

2. SECOND EMBODIMENT

Next, a second embodiment of the present technology will be described with reference to FIGS. 13 to 16.

Configuration Example of Imaging Apparatus 201

Figure 13:
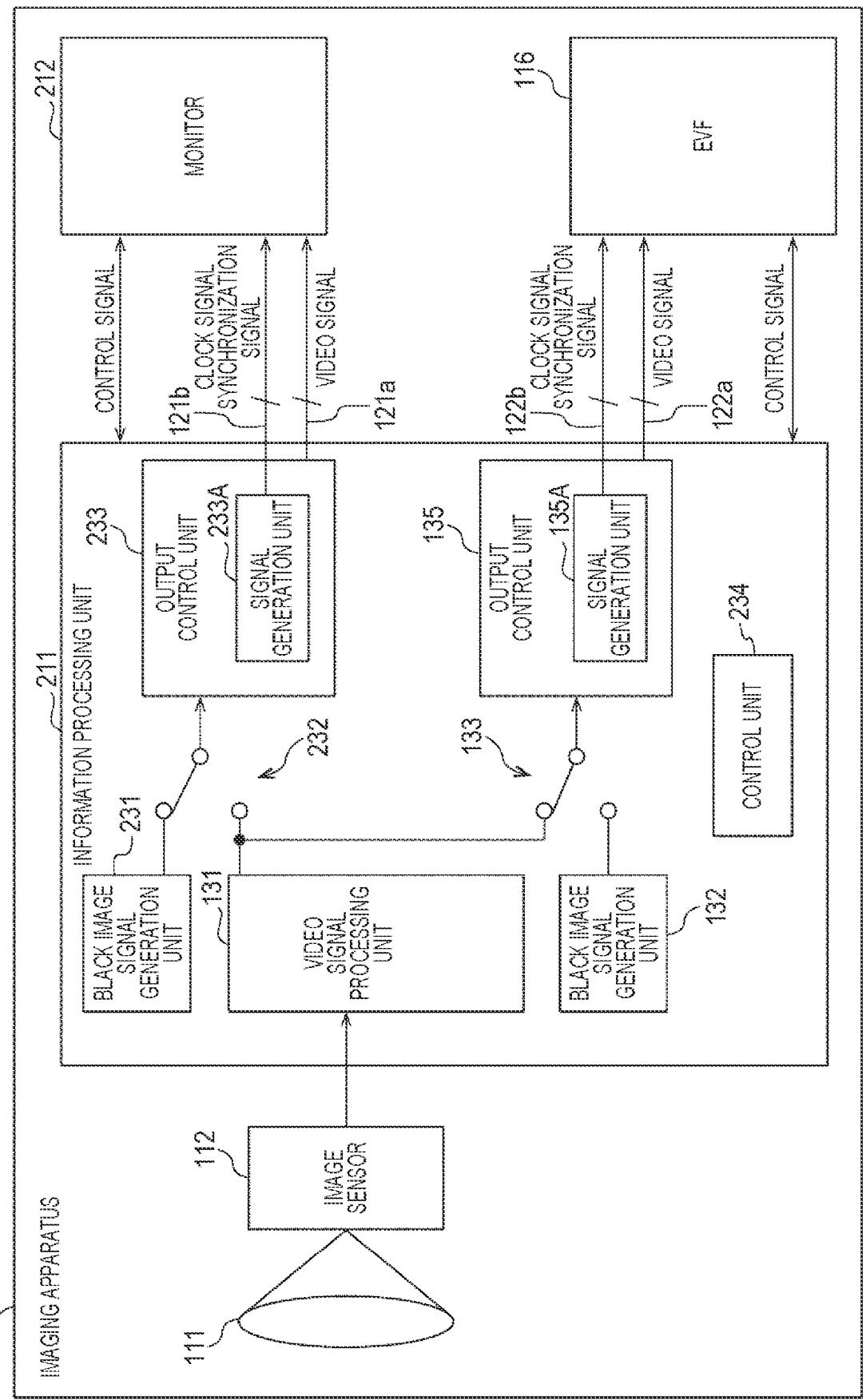
FIG. 13 is a block diagram illustrating a second embodiment of an imaging apparatus to which the present technology is applied.

FIG. 13 is a block diagram illustrating a configuration example of an imaging apparatus 201 to which the present technology is applied. Note that, in the drawing, portions corresponding to those of the imaging apparatus 101 in FIG. 1 are denoted by the same reference numerals, and description thereof will be omitted as appropriate.

The imaging apparatus 201 is largely different from the imaging apparatus 101 in that both a monitor 212 and the EVF 116 are constituted by self-light-emitting type display devices. Specifically, the imaging apparatus 201 is identical to the imaging apparatus 101 in that the optical system 111, the image sensor 112, and the EVF 116 are included, and is different therefrom in that an information processing unit 211 and the monitor 212 are included instead of the information processing unit 113 and the monitor 115 and that the power supply circuit 114 is deleted. Furthermore, the information processing unit 211 is identical to the information processing unit 113 in that the video signal processing unit 131, the black image signal generation unit 132, the switching unit 133, and the output control unit 135 are included, and is different therefrom in that an output control unit 233 and a control unit 234 are included instead of the output control unit 134 and the control unit 136 and that a black image signal generation unit 231 and a switching unit 232 are added.

The black image signal generation unit 231 generates a black image signal and supplies it to the switching unit 232.

The switching unit 232 selects one of a video signal from the video signal processing unit 131 and the black image signal from the black image signal generation unit 231 by switching a state of a contact under the control of the control unit 234, and supplies the selected signal to the output control unit 233.

The output control unit 233 performs output control to convert the video signal into a resolution and a format suitable for the monitor 212 and to output the converted video signal (hereinafter referred to as a monitor video signal) to the monitor 212 via a bus 121a.

Furthermore, the output control unit 233 incorporates a signal generation unit 233A. The signal generation unit 233A performs output control to generate a clock signal and a synchronization signal (a horizontal synchronization signal and a vertical synchronization signal) and to output the signals to the monitor 212 via a bus 121b.

The control unit 234 includes, for example, a CPU. The control unit 234 controls each unit of the information processing unit 211. Furthermore, the control unit 234 supplies a control signal to the EVF 116 and the monitor 212 to perform each control.

Similarly to the monitor 115 of the imaging apparatus 101, the monitor 212 is provided on a back surface of the imaging apparatus 201 and realizes a monitor function of displaying a video captured by the image sensor 112 on a large screen. However, unlike the monitor 115, the monitor 212 includes an organic EL display that is a self-light-emitting type display device, similarly to the EVF 116.

Configuration Example of Display Control Unit 251

Figure 14:
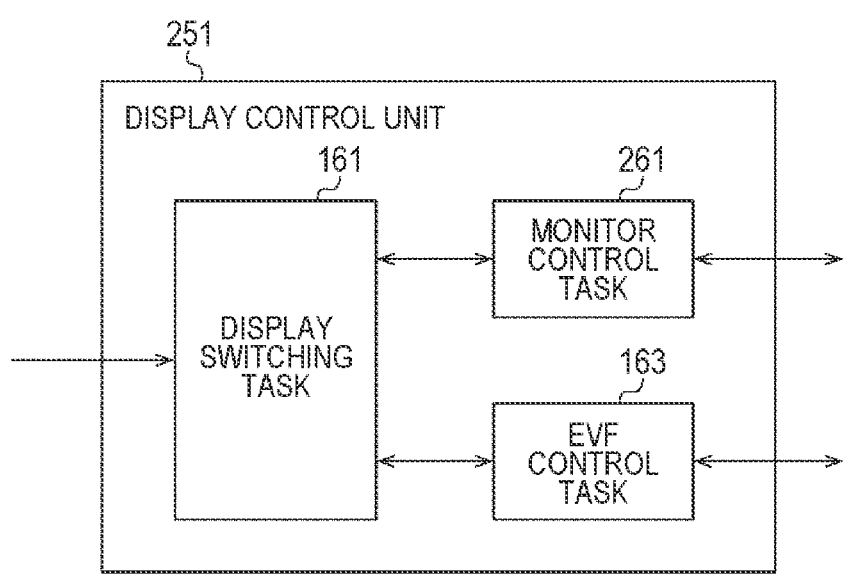
FIG. 14 is a block diagram illustrating a configuration example of a display control unit.

FIG. 13 illustrates a configuration example of a display control unit 251, which is one of the functions implemented by the control unit 234 of the imaging apparatus 201 in FIG. 14. Note that, in the drawing, portions corresponding to those of the display control unit 151 in FIG. 2 are denoted by the same reference numerals, and description thereof will be omitted as appropriate.

The display control unit 251 is identical to the display control unit 151 in that the display switching task 161 and the EVF control task 163 are included, and is different therefrom in that a monitor control task 261 is included instead of the monitor control task 162.

The monitor control task 261 controls display of a video by the monitor 212 by controlling the switching unit 232, the output control unit 233, and the monitor 212.

Display Switching Processing

Next, display switching processing of the imaging apparatus 201 will be described with reference to a flowchart of FIG. 15 and a timing chart of FIG. 16. Note that, in this processing, processing similar to the fourth embodiment of the display switching processing of the imaging apparatus 101 described above with reference to FIGS. 9 and 10 is realized by the imaging apparatus 201.

Figure 15:
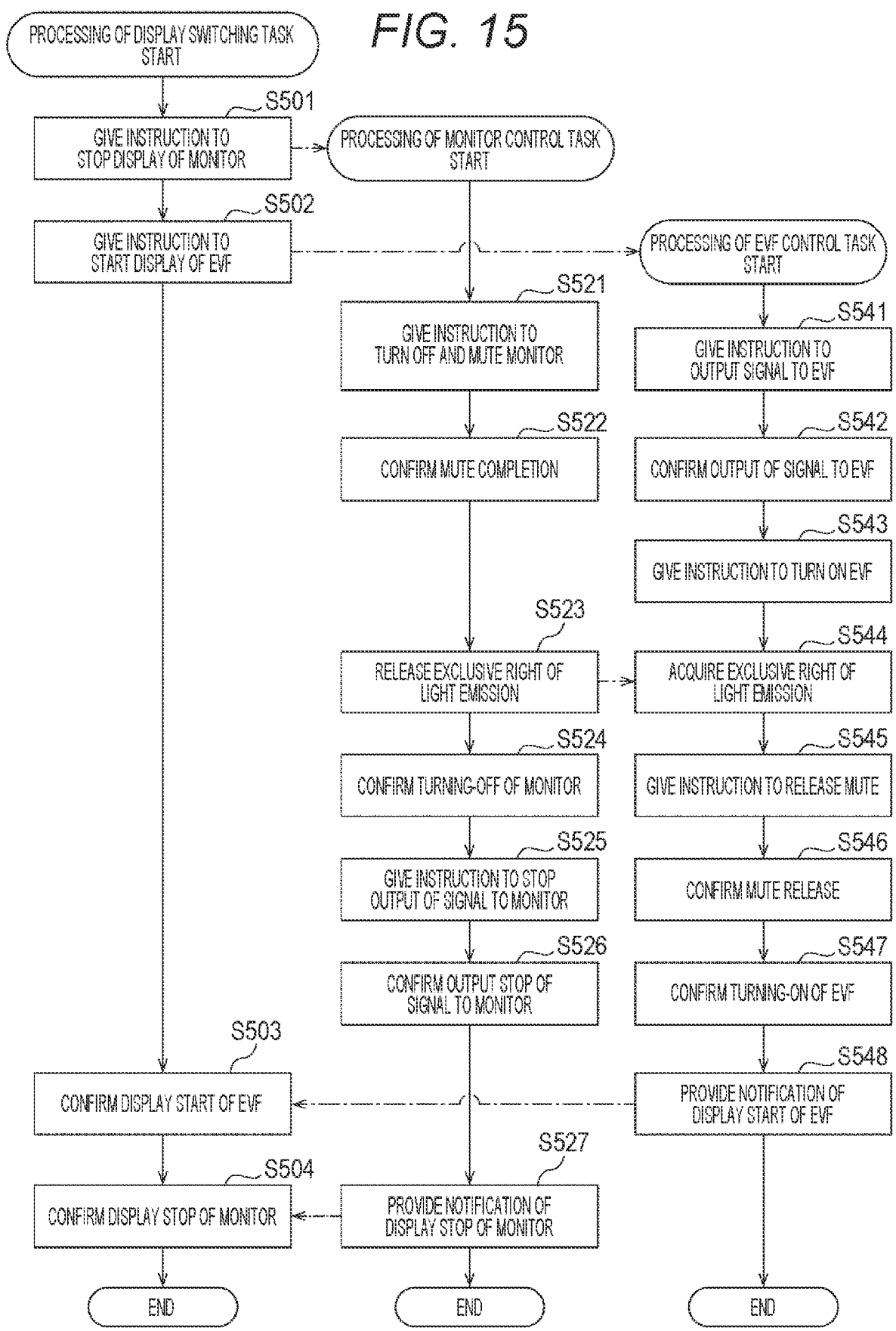
FIG. 15 is a flowchart for explaining display switching processing of the imaging apparatus in FIG. 13.
Figure 16:
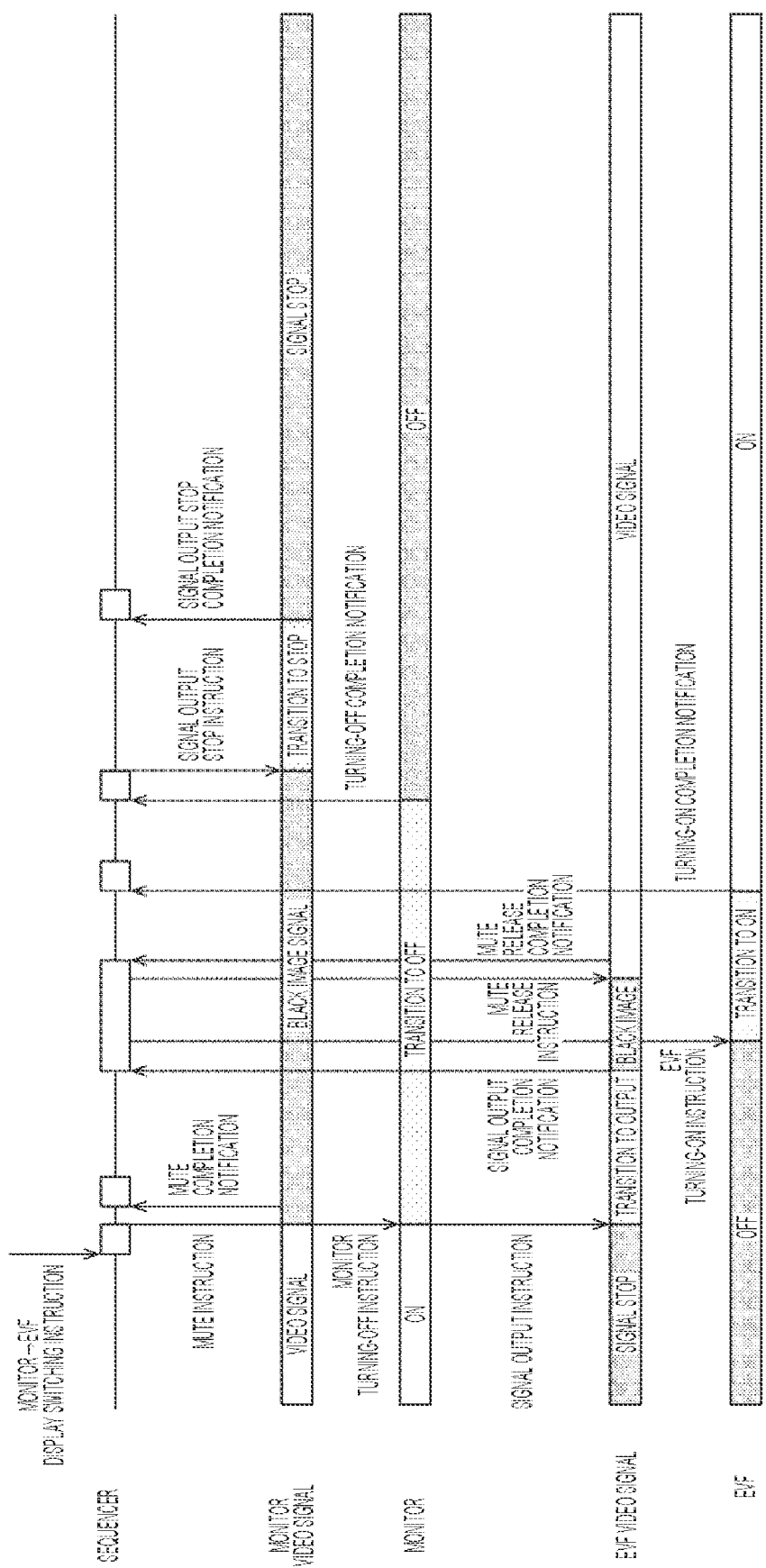
FIG. 16 is a timing chart for explaining the display switching processing of the imaging apparatus in FIG. 13.

The flowchart of FIG. 15 illustrates a flow of processing of the display switching task 161, the monitor control task 261, and the EVF control task 163 of FIG. 14. The timing chart of FIG. 16 illustrates a timing chart of a sequencer of the control unit 234, a monitor video signal, the monitor 212, an EVF video signal, and the EVF 116.

This processing is started, for example, when an instruction to switch display of a video from the monitor 212 to the EVF 116 is input through an input unit (not illustrated).

Note that it is assumed that the monitor 212 is turned on in an initial state. Furthermore, it is assumed that a contact of the switching unit 133 is set on the video signal processing unit 131 side, a video signal is supplied from the video signal processing unit 131 to the output control unit 233, and a monitor video signal, a clock signal, and a synchronization signal are output from the output control unit 233 to the monitor 212. In other words, it is assumed that the monitor 212 is in an activated state and displays a video based on a video signal such as a monitor and the like.

Furthermore, it is assumed that the EVF 116 is turned off and is in a stopped state. Moreover, it is assumed that the contact of the switching unit 133 is set on the black image signal generation unit 132 side, a black image signal is supplied from the black image signal generation unit 132 to the output control unit 135, and no signal is output from the output control unit 135.

In step S501, the display switching task 161 gives an instruction to stop display of the monitor 115. Specifically, the display switching task 161 generates a display stop command and transmits it to the monitor control task 261.

On the other hand, in step S521, the monitor control task 261 gives an instruction to turn off and mute the monitor 212. Specifically, the monitor control task 261 generates a monitor turning-off command and transmits it to the monitor 212.

On the other hand, the monitor 212 starts turning-off processing.

Furthermore, the monitor control task 261 generates a mute command and transmits it to the switching unit 232.

On the other hand, the switching unit 232 switches the contact from the video signal processing unit 131 side to the black image signal generation unit 231 side. Therefore, supply of the black image signal from the video signal processing unit 131 to the output control unit 233 is started, and supply of the black image signal from the output control unit 233 to the monitor 212 is started.

Note that a time required for output of the output control unit 233 to switch from the monitor video signal to the black image signal is shorter than a time required for the monitor 212 to be turned off. Therefore, before the monitor 212 is turned off, a black image based on the black image signal is displayed on the monitor 212, and the monitor 212 transitions from the activated state to a standby state.

Then, when switching the contact from the video signal processing unit 131 side to the black image signal generation unit 231 side, the switching unit 232 generates a mute completion command and transmits it to the monitor control task 261.

On the other hand, in step S522, the monitor control task 261 confirms mute completion by receiving the mute completion command from the switching unit 232.

In step S523, the monitor control task 261 releases an exclusive right of light emission.

Furthermore, when the turning-off is completed, that is, when the standby state transitions to a stopped state, the monitor 212 generates a turning-off completion command and transmits it to the monitor control task 162.

On the other hand, in step S524, the monitor control task 261 confirms turning-off of the monitor 212 by receiving the turning-off completion command from the monitor 212.

In step S525, the monitor control task 261 gives an instruction to stop output of a signal to the monitor 212. Specifically, the monitor control task 261 generates a signal output stop command and transmits it to the output control unit 233.

On the other hand, the output control unit 233 stops output of the monitor video signal, the clock signal, and the synchronization signal. Then, when the output of each signal is stopped, the output control unit 233 generates a signal output stop completion command and transmits it to the monitor control task 261.

On the other hand, in step S526, the monitor control task 261 confirms the output stop of the signal to the monitor 212 by receiving the signal output stop completion command from the output control unit 134.

In step S527, the monitor control task 261 provides notification of display stop of the monitor 212. Specifically, the monitor control task 261 generates a display stop completion command and transmits it to the display switching task 161.

Thereafter, the processing of the monitor control task 261 ends.

On the other hand, in step S504, the display switching task 161 confirms the display stop of the monitor 212 by receiving the display stop completion command from the monitor control task 261.

On the other hand, in step S502, similarly to the processing in step S2 in FIG. 3, the display switching task 161 instructs the EVF control task 163 to start display of the EVF 116.

On the other hand, processing similar to that in steps S441 to S448 in FIG. 11 is performed in steps S541 to S548. Therefore, the EVF 116 transitions from the stopped state to an activated state, and starts displaying a video based on the EVF video signal.

Thereafter, the processing of the EVF control task 163 ends.

On the other hand, in step S503, similarly to the processing in step S3 in FIG. 3, the display switching task 161 confirms the display start of the EVF 116.

Then, after the processing in steps S503 and S504 ends, the processing of the display switching task 161 ends.

Note that there is a case where timings of the processing in steps S503 and S504 are before or after depending on operation timings of the monitor 212 and the EVF 116, and the like.

As described above, the display of the video is switched from the monitor 212 to the EVF 116. Note that, for example, the EVF 116 performs the state transition similar to that of the monitor 212 described above, and the monitor 212 performs the state transition similar to that of the EVF 116 described above, whereby the display of the video can be switched from the EVF 116 to the monitor 212.

Furthermore, similarly to the fourth embodiment of the display switching processing of the imaging apparatus 101 described above with reference to FIGS. 9 and 10, a switching time of the display of the video is shortened, and a peak of power consumption can be suppressed.

3. THIRD EMBODIMENT

Next, a third embodiment of the present technology will be described with reference to FIGS. 17 to 20.

Configuration Example of Imaging Apparatus 301

Figure 17:
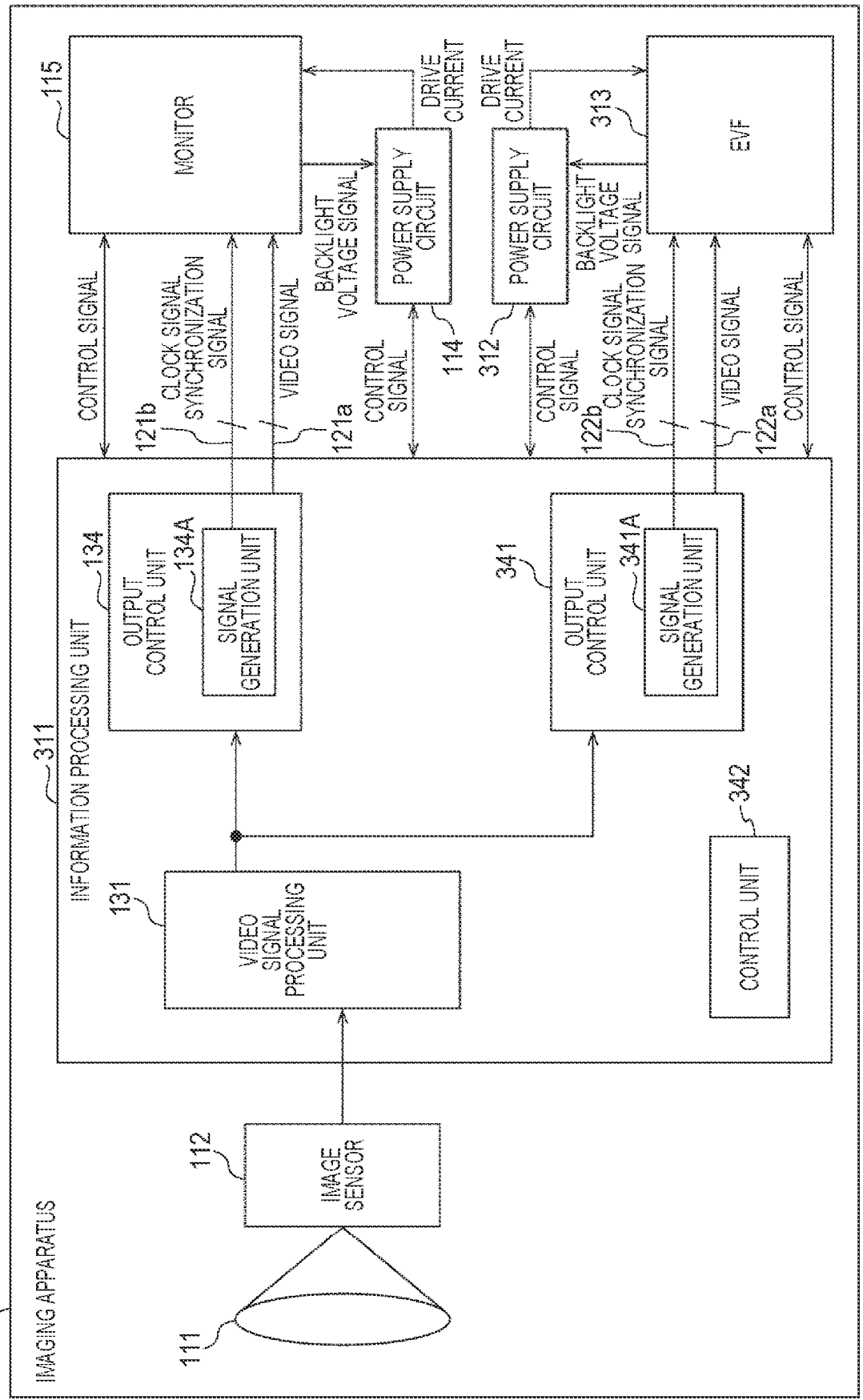
FIG. 17 is a block diagram illustrating a third embodiment of an imaging apparatus to which the present technology is applied.

FIG. 17 is a block diagram illustrating a configuration example of an imaging apparatus 301 to which the present technology is applied. Note that, in the drawing, portions corresponding to those of the imaging apparatus 101 in FIG. 1 are denoted by the same reference numerals, and description thereof will be omitted as appropriate.

The imaging apparatus 301 is largely different from the imaging apparatus 101 in that both the monitor 115 and an EVF 313 are constructed with other light-emitting type display devices. Specifically, the imaging apparatus 301 is identical to the imaging apparatus 101 in that the optical system 111, the image sensor 112, the power supply circuit 114, and the monitor 115 are included, and is different therefrom in that an information processing unit 311 and the EVF 313 are included instead of the information processing unit 113 and the EVF 116 and that a power supply circuit 312 is added. Furthermore, the information processing unit 311 is identical to the information processing unit 113 in that the video signal processing unit 131 and the output control unit 134 are included, and is different therefrom in that an output control unit 341 and a control unit 342 are included instead of the output control unit 135 and the control unit 136 and that the switching unit 133 is deleted.

The output control unit 341 performs output control to convert a video signal supplied from the video signal processing unit 131 into a resolution and a format suitable for the EVF 313 and to output the converted video signal (hereinafter referred to as an EVF video signal) to the EVF 313 through the bus 122a.

Furthermore, the output control unit 341 incorporates a signal generation unit 341A. The signal generation unit 341A performs output control to generate a clock signal and a synchronization signal (a horizontal synchronization signal and a vertical synchronization signal) and to output the signals to the EVF 313 via the bus 122b.

The control unit 342 includes, for example, a central processing unit (CPU). The control unit 342 controls each unit of the information processing unit 311. Furthermore, the control unit 342 supplies a control signal to the power supply circuit 114, the monitor 115, the power supply circuit 312, and the EVF 313 to perform each control.

The power supply circuit 312 is turned on or off under the control of the control unit 342. Furthermore, the power supply circuit 312 controls a drive current supplied to the EVF 313 under the control of the control unit 342, thereby controlling turning-on, turning-off, and brightness of a light source (backlight) of the EVF 313. Moreover, the power supply circuit 312 controls the drive current according to a backlight voltage signal supplied from the EVF 313, and controls turning-on, turning-off, and brightness of the light source of EVF 313.

Similarly to the monitor 115, the EVF 313 is constructed with a liquid crystal display that is another light-emitting type display device, and includes a liquid crystal panel (hereinafter simply referred to as a panel) and a light source that irradiates the panel with the backlight.

The EVF 313 operates according to the clock signal and the synchronization signal supplied from signal generation unit 341A, and displays a video based on the video signal supplied from output control unit 341. The panel and the light source of the EVF 313 are individually controlled by a control signal supplied from control unit 342. Furthermore, the turning-on and turning-off of the light source and the brightness of the backlight are controlled by the drive current supplied from the power supply circuit 312.

Configuration Example of Display Control Unit 351

Figure 18:
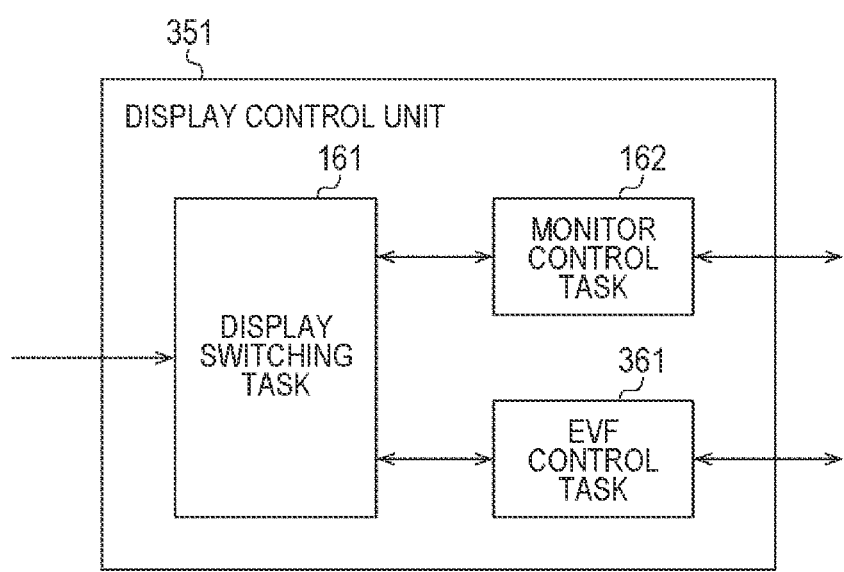
FIG. 18 is a block diagram illustrating a configuration example of a display control unit.

FIG. 18 illustrates a configuration example of a display control unit 351, which is one of the functions implemented by the control unit 342 of the imaging apparatus 301 in FIG. 17. Note that, in the drawing, portions corresponding to those of the display control unit 151 in FIG. 2 are denoted by the same reference numerals, and description thereof will be omitted as appropriate.

The display control unit 351 is identical to the display control unit 151 in that the display switching task 161 and the monitor control task 162 are included, and is different therefrom in that an EVF control task 361 is included instead of the EVF control task 163.

The EVF control task 361 controls display of a video by the EVF 313 by controlling the output control unit 341, the power supply circuit 312, and the EVF 313.

Display Switching Processing

Next, display switching processing of the imaging apparatus 301 will be described with reference to a flowchart of FIG. 19 and a timing chart of FIG. 20. Note that, in this processing, processing similar to that of the fifth embodiment of the display switching processing of the imaging apparatus 101 described above with reference to FIGS. 11 and 12 is realized by the imaging apparatus 301.

Figure 19:
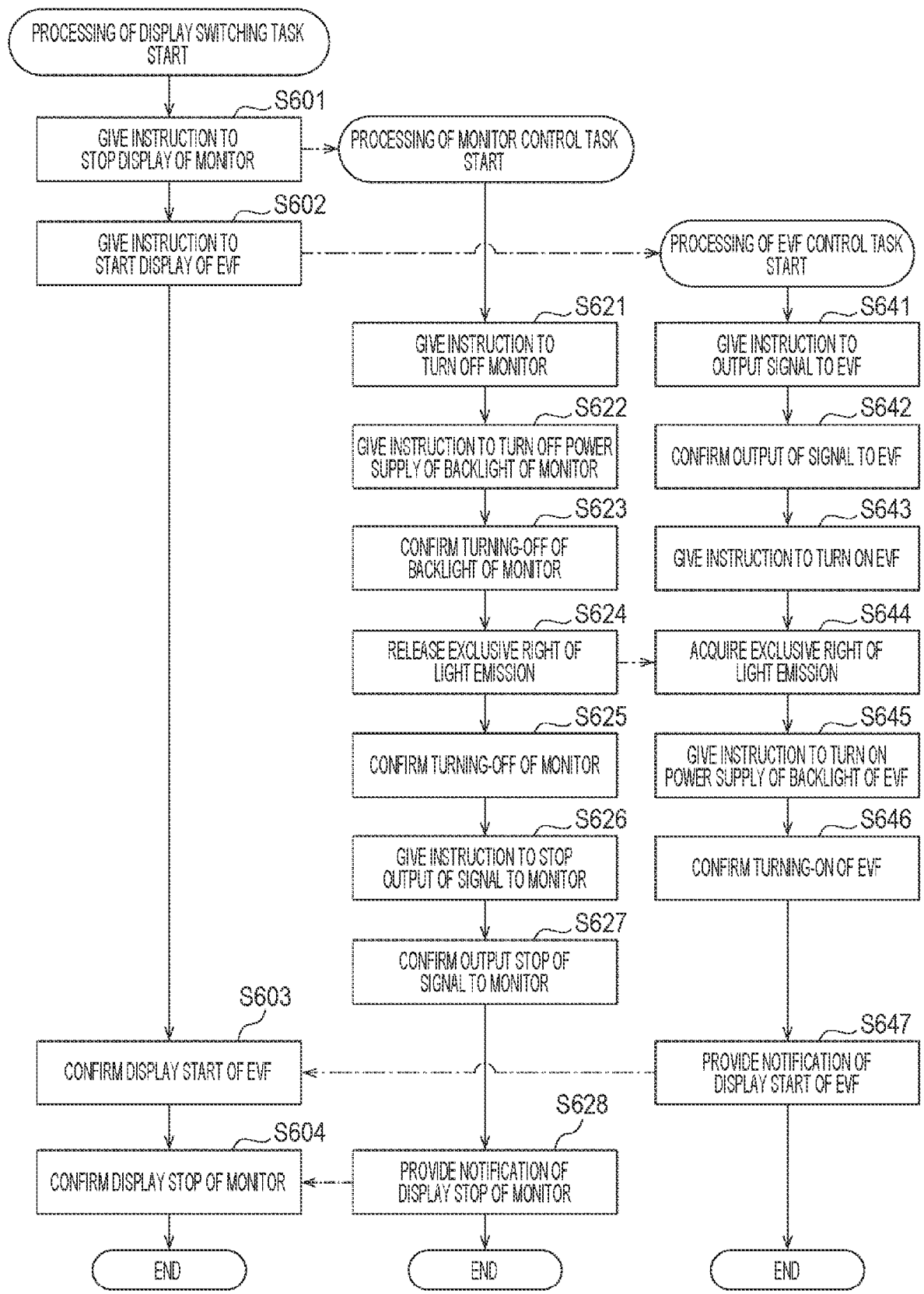
FIG. 19 is a flowchart for explaining display switching processing of the imaging apparatus in FIG. 17.
Figure 20:
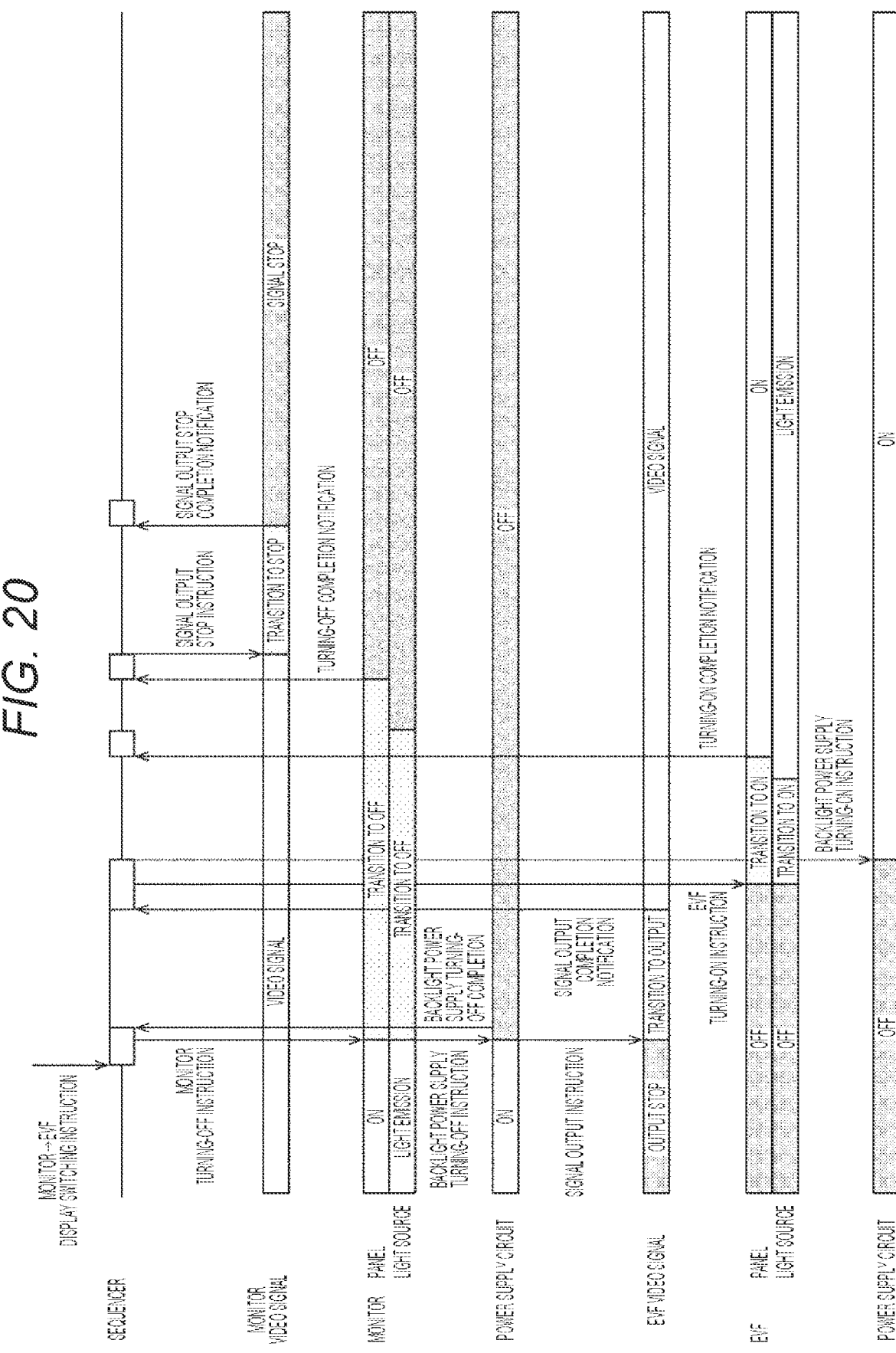
FIG. 20 is a timing chart for explaining the display switching processing of the imaging apparatus in FIG. 17.

The flowchart of FIG. 19 illustrates a flow of processing of the display switching task 161, the monitor control task 162, and the EVF control task 361 of FIG. 18. The timing chart of FIG. 20 illustrates a timing chart of a sequencer of the control unit 342, a monitor video signal, a panel and a power supply of the monitor 115, the power supply circuit 114, an EVF video signal, the panel and the light source of the EVF 313, and the power supply circuit 312.

This processing is started, for example, when an instruction to switch display of a video from the monitor 115 to the EVF 313 is input through an input unit (not illustrated).

Note that, in an initial state, it is assumed that the drive current is supplied from the power supply circuit 114 to the monitor 115, the panel of the monitor 115 is turned on, and the light source emits light. Furthermore, it is assumed that a monitor video signal, a clock signal, and a synchronization signal are output from the output control unit 134 to the monitor 115. In other words, it is assumed that the monitor 115 is in an activated state and displays a video based on the monitor video signal.

Furthermore, it is assumed that the power supply circuit 312 is turned off, and the panel and the light source of the EVF 313 are turned off. In other words, it is assumed that the EVF 313 is in a stopped state. Furthermore, it is assumed that a signal is not output from the output control unit 341 to the EVF 313.

In step S601, similarly to the processing in step S1 of FIG. 3, the display switching task 161 instructs the monitor control task 162 to stop display of the monitor 115.

On the other hand, processing similar to that in steps S421 to S428 in FIG. 11 is performed in steps S621 to S628.

Therefore, the monitor 115 transitions from the activated state to a standby state, stops display of the video, and then further transitions from the standby state to a stopped state. Furthermore, by turning off the power supply circuit 114, the transition of the monitor 115 from the activated state to the standby state is quickly performed.

On the other hand, in step S604, similarly to the processing in step S4 in FIG. 3, the display switching task 161 confirms display stop of the monitor 115.

On the other hand, in step S602, similarly to the processing in step S2 in FIG. 3, the display switching task 161 instructs the EVF control task 361 to start display of the EVF 313.

On the other hand, in step S641, the EVF control task 361 gives an instruction to output a signal to the EVF 313. Specifically, the EVF control task 361 generates a signal output command and transmits it to the output control unit 341.

On the other hand, the output control unit 341 starts output of the EVF video signal, the clock signal, and the synchronization signal. However, since the EVF 313 is not turned on, a video is not displayed on the EVF 313. Then, when the output of each signal is started, the output control unit 341 generates a signal output completion command for providing notification of completion of the output of each signal, and transmits the command to the EVF control task 361.

On the other hand, in step S642, the EVF control task 361 confirms the start of the signal output to the EVF 313 by receiving the signal output completion command from the output control unit 341.

In step S643, the EVF control task 361 gives an instruction to turn on the EVF 313. Specifically, the EVF control task 361 generates an EVF turning-on command and transmits it to the EVF 313.

On the other hand, the EVF 313 starts processing of turning on the panel and light emission of the light source.

Thereafter, the EVF control task 361 waits until an exclusive right of light emission is released, and acquires the exclusive right of light emission in step S644 when the exclusive right of light emission is released in the processing in step S624.

In step S645, the EVF control task 361 instructs to turn on a power supply of the backlight of the EVF 313. Specifically, the EVF control task 361 generates a backlight power supply turning-on command and supplies it to the power supply circuit 312.

On the other hand, the power supply circuit 312 is turned on to start supply of the drive current to the EVF 313.

As described above, until it is confirmed in step S622 that the backlight of the monitor 115 is turned off, the supply of the drive current from the power supply circuit 312 to the EVF 313 is stopped, and the backlight of the EVF 313 is prevented from being turned on.

Furthermore, when the monitor and the light source are turned on, the EVF 313 generates a turning-on completion command and transmits it to the EVF control task 361.

On the other hand, in step S646, the EVF control task 361 confirms turning-on of the EVF 313 by receiving the turning-on completion command from the EVF 313.

In step S647, the EVF control task 361 provides notification of display start of the EVF 313. Specifically, the EVF control task 361 generates a display start completion command and transmits it to the display switching task 161.

Thereafter, the processing of the EVF control task 361 ends.

On the other hand, in step S604, similarly to the processing in step S3 in FIG. 3, the display switching task 161 confirms the display start of the EVF 313.

Then, after the processing in steps S603 and S604 ends, the processing of the display switching task 161 ends.

Note that there is a case where timings of the processing in steps S603 and S604 are before or after depending on operation timings of the monitor 115 and the EVF 313, and the like.

As described above, the display of the video is switched from the monitor 115 to the EVF 313. Note that, for example, the EVF 313 performs the state transition similar to that of the monitor 115 described above, and the monitor 115 performs the state transition similar to that of the EVF 313 described above, whereby the display of the video can be switched from the EVF 313 to the monitor 115.

Furthermore, similarly to the fifth embodiment of the display switching processing of the imaging apparatus 101 described above with reference to FIGS. 11 and 12, a switching time of the display of the video can be shortened.

4. MODIFIED EXAMPLES

Hereinafter, modified examples of the above-described embodiments of the present technology will be described.

The present technology can also be applied to, for example, a case of switching display of a video of an imaging apparatus including three or more display devices to which video signals are supplied by different buses.

Furthermore, the present technology can also be applied to, for example, a case of switching display of a video of a system or an apparatus including a plurality of display devices (for example, a smartphone, a personal computer, a personal digital assistant, and the like) other than the imaging apparatus. Furthermore, a system and an apparatus to which the present technology is applied do not necessarily need to include an imaging unit (image sensor), and for example, a video signal may be acquired from an imaging unit provided outside. Moreover, for example, the video whose display is to be switched is not limited to the captured video, and may be a video recorded in a recording medium, a video received from the outside, and the like. Furthermore, for example, a part or all of the display device to be controlled may be provided outside the system or the apparatus.

Moreover, the type of the display device described above is an example, and other types of self-light-emitting type or other light-emitting type display devices can be used.

5. OTHERS

Configuration Example of Computer

The series of processing described above can be executed by hardware or software. In a case where the series of processing is executed by the software, a program constituting the software is installed on a computer. Here, the computer includes a computer incorporated in dedicated hardware, a general-purpose personal computer capable of executing various functions by installing various programs, and the like, for example.

Figure 21:
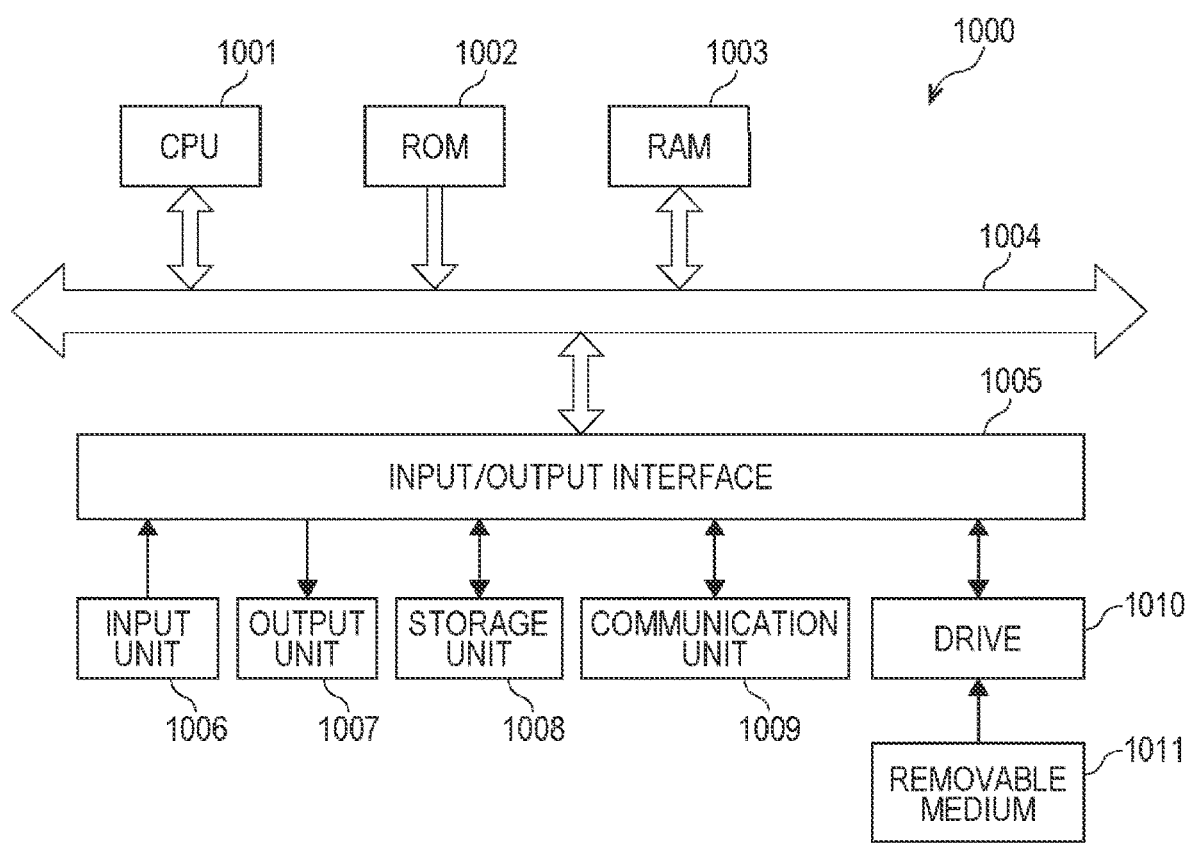
FIG. 21 is a diagram illustrating a configuration example of a computer.

FIG. 21 is a block diagram illustrating a configuration example of hardware of a computer that executes the above-described series of processing by a program.

In a computer 1000, a central processing unit (CPU) 1001, a read only memory (ROM) 1002, and a random access memory (RAM) 1003 are mutually connected by a bus 1004.

Moreover, an input/output interface 1005 is connected to the bus 1004. An input unit 1006, an output unit 1007, a recording unit 1008, a communication unit 1009, and a drive 1010 are connected to the input/output interface 1005.

The input unit 1006 includes an input switch, a button, a microphone, an imaging element, and the like. The output unit 1007 includes a display, a speaker, and the like. The recording unit 1008 includes a hard disk, a nonvolatile memory, and the like. The communication unit 1009 includes a network interface and the like. The drive 1010 drives a removable medium 1011 such as a magnetic disk, an optical disk, a magneto-optical disk, or a semiconductor memory.

In the computer 1000 configured as described above, for example, the CPU 1001 loads a program stored in the recording unit 1008 into the RAM 1003 via the input/output interface 1005 and the bus 1004 and executes the program, whereby the above-described series of processing is performed.

The program executed by the computer 1000 (CPU 1001) can be provided by recording on the removable medium 1011 as a package medium and the like, for example. Furthermore, the program can be provided via a wired or wireless transmission medium such as a local area network, the Internet, or digital satellite broadcasting.

In the computer 1000, the program can be installed in the recording unit 1008 via the input/output interface 1005 by attaching the removable medium 1011 to the drive 1010. Furthermore, the program can be received by the communication unit 1009 via a wired or wireless transmission medium and installed in the recording unit 1008. In addition, the program can be installed in the ROM 1002 or the recording unit 1008 in advance.

Note that the program executed by the computer may be a program in which processing is performed in time series in the order described in the present specification, or may be a program in which processing is performed in parallel or at necessary timing such as when a call is made, and the like.

Furthermore, in the present specification, the system means a set of a plurality of components (devices, modules (parts), and the like), and it does not matter whether or not all the components are in the same housing. Therefore, a plurality of devices housed in separate housings and connected via a network, and one device housing a plurality of modules in one housing are both systems.

Moreover, embodiments of the present technology are not limited to the above-described embodiments, and various modifications can be made without departing from the scope of the present technology.

For example, the present technology can be configured as cloud computing in which one function is shared and jointly processed by a plurality of devices via a network.

Furthermore, each step described in the above-described flowcharts can be executed by one device or shared and executed by a plurality of devices.

Moreover, in a case where one step includes a plurality of processing, the plurality of processing included in the one step can be executed by one device or shared and executed by a plurality of devices.

Combination Example of Configurations

Note that the present technology can have the following configurations.

(1)

An information processing apparatus including:
 a display control unit that, in a case where display of a video is switched from a first display unit to which a first video signal is input via a first bus to a second display unit to which a second video signal is input via a second bus, causes the first display unit to transition from an activated state in which operation is performed in a light-emitting state to a standby state in which operation is performed in a non-light-emitting state or a stopped state in which operation is stopped in the non-light-emitting state, and causes the second display unit to transition from the standby state or the stopped state to the activated state.

(2)

The information processing apparatus according to (1),
 in which the display control unit causes processing of causing the first display unit to transition from the activated state to the standby state or the stopped state and processing of causing the second display unit to transition from the standby state or the stopped state to the activated state to be performed in parallel.

(3)

The information processing apparatus according to (2),
 in which the display control unit causes the second display unit to transition from the non-light-emitting state to the light-emitting state after causing the first display unit to transition from the light-emitting state to the non-light-emitting state.

(4)

The information processing apparatus according to (3),
 in which the display control unit causes the first display unit to transition from the activated state to the standby state or the stopped state, causes the second display unit to transition from the stopped state to the standby state, and then causes the second display unit to transition to the activated state.

(5)

The information processing apparatus according to (3) or (4),
 in which the first display unit is of another light-emitting type, and
 the display control unit causes the first display unit to transition to the non-light-emitting state by turning off a power supply that supplies power to a light source that irradiates a display element of the first display unit with light.

(6)

The information processing apparatus according to any one of (2) to (5), further including:
 a first output control unit that controls output of the first video signal to the first display unit via the first bus; and
 a second output control unit that controls output of the second video signal to the second display unit via the second bus.

(7)

The information processing apparatus according to (6),
 in which the first output control unit stops output of the first video signal to the first display unit in a case where display of the video is switched, and
 the second output control unit starts output of the second video signal to the second display unit in a case where display of the video is switched.

(8)

The information processing apparatus according to (7),
 in which the first output control unit stops output of the first video signal to the first display unit after the first display unit transitions to the stopped state.

(9)

The information processing apparatus according to (7),
 in which the display control unit causes processing of causing the first display unit to transition from the activated state to the stopped state and processing of causing the second display unit to transition from the stopped state to the activated state to be performed in parallel.

(10)

The information processing apparatus according to (6),
 in which the first output control unit continues supply of the first video signal to the first display unit regardless of a state of the first display unit, and
 the second output control unit continues supply of the second video signal to the second display unit regardless of a state of the second display unit.

(11)

The information processing apparatus according to (10),
 in which the display control unit causes processing of causing the first display unit to transition from the activated state to the stopped state and processing of causing the second display unit to transition from the stopped state to the activated state to be performed in parallel.

(12)

The information processing apparatus according to (1),
 in which the display control unit causes the second display unit to transition from the standby state to the activated state after causing the first display unit to transition from the activated state to the standby state.

(13)

The information processing apparatus according to any one of (1) to (12), in which the light-emitting state is a state in which a light source that irradiates a display element of a display unit with light is turned on in a case where the display unit is of another light-emitting type, and is a state in which the display unit is turned on and a video different from a black image is displayed in a case where the display unit is of a self-light-emitting type, the non-light-emitting state is a state in which the light source is turned off in a case where the display unit is of another light-emitting type, and is a state in which the display unit is turned on and a black image is displayed or a state in which the display unit is turned off in a case where the display unit is of a self-light-emitting type, the activated state is a state in which the display element is turned on and the light source emits light in a case where the display unit is of another light-emitting type, and is a state in which the display unit is turned on and a video different from a black image is displayed in a case where the display unit is of a self-light-emitting type, the standby state is a state in which the display element is turned on and the light source does not emit light in a case where the display unit is of another light-emitting type, and is a state in which the display unit is turned on and a black image is displayed in a case where the display unit is of a self-light-emitting type, and the stopped state is a state in which the display element and the light source are turned off in a case where the display unit is of another light-emitting type, and is a state in which the display unit is turned off in a case where the display unit is of a self-light-emitting type.

(14)

The information processing apparatus according to any one of (1) to (13), further including:
the first display unit;
the second display unit;
the first bus; and
the second bus.

(15)

The information processing apparatus according to (14), further including:
an imaging unit,
in which one of the first display unit and the second display unit is a monitor, and another is an electronic view finder (EVF).

(16)

A display control method,
in which in an information processing apparatus, in a case where display of a video is switched from a first display unit to which a first video signal is input via a first bus to a second display unit to which a second video signal is input via a second bus, the first display unit is caused to transition from an activated state in which operation is performed in a light-emitting state to a standby state in which operation is performed in a non-light-emitting state or a stopped state in which operation is stopped in the non-light-emitting state, and the second display unit is caused to transition from the standby state or the stopped state to the activated state.

(17)

A program that causes a computer to execute processing of,
in a case where display of a video is switched from a first display unit to which a first video signal is input via a first bus to a second display unit to which a second video signal is input via a second bus, causing the first display unit to transition from an activated state in which operation is performed in a light-emitting state to a standby state in which operation is performed in a non-light-emitting state or a stopped state in which operation is stopped in the non-light-emitting state, and causing the second display unit to transition from the standby state or the stopped state to the activated state.

(18)

An imaging apparatus including:
an imaging unit;
a first bus;
a second bus;
a first display unit to which a first video signal based on a video signal captured by the imaging unit is input via the first bus;
a second display unit to which a second video signal based on a video signal captured by the imaging unit is input via the second bus; and
a display control unit that, in a case where display of a video is switched from the first display unit to the second display unit, causes the first display unit to transition from an activated state in which operation is performed in a light-emitting state to a standby state in which operation is performed in a non-light-emitting state or a stopped state in which operation is stopped in the non-light-emitting state, and causes the second display unit to transition from the standby state or the stopped state to the activated state.

(19)

An information processing apparatus including:
a display control unit that, in a case where display of a video is switched from a first display unit to which a first video signal is input via a first bus to a second display unit to which a second video signal is input via a second bus, causes processing of causing the first display unit to transition from a light-emitting state to a non-light-emitting state and processing of causing the second display unit to transition from the non-light-emitting state to the light-emitting state to be performed in parallel.

Note that the effects described in the present specification are merely examples and are not limited, and there may be other effects.

REFERENCE SIGNS LIST

101 Imaging apparatus
112 Image sensor
113 Information processing unit
114 Power supply circuit
115 Monitor
116 EVF
121a, 121b, 122a, 122b Bus
131 Video signal processing unit
132 Black image signal generation unit
133 Switching unit
134 Output control unit
134A Signal generation unit
135 Output control unit
135A Signal generation unit
136 Control unit
151 Display control unit
161 Display switching task
162 Monitor control task
163 EVF control task
201 Imaging apparatus
211 Information processing unit 212 Monitor
231 Black image signal generation unit
232 Switching unit
233 Output control unit
233A Signal generation unit
234 Control unit
251 Display control unit
261 Monitor control task
301 Imaging apparatus
311 Information processing unit
312 Power supply circuit
313 EVF
341 Output control unit
341A Signal generation unit
342 Control unit
351 Display control unit
361 Monitor control task

The invention claimed is:

1. An information processing apparatus, comprising:
a display control unit configured to, in a case where display of a video is switched from a first display unit to which a first video signal is input via a first bus to a second display unit to which a second video signal is input via a second bus:
cause the first display unit to transition from an activated state in which operation is performed in a light-emitting state to one of a standby state in which operation is performed in a non-light-emitting state or a stopped state in which operation is stopped in the non-light-emitting state; and
cause the second display unit to transition from one of the standby state or the stopped state to the activated state.

2. The information processing apparatus according to claim 1, wherein the display control unit is further configured to:
control a first process to cause the first display unit to transition from the activated state to one of the standby state or the stopped state; and
control a second process to cause the second display unit to transition from one of the standby state or the stopped state to the activated state to be performed in parallel with the first process.

3. The information processing apparatus according to claim 2, wherein the display control unit is further configured to cause the second display unit to transition from the non-light-emitting state to the light-emitting state after causing the first display unit to transition from the light-emitting state to the non-light-emitting state.

4. The information processing apparatus according to claim 3, wherein the display control unit is further configured to:
cause the first display unit to transition from the activated state to one of the standby state or the stopped state;
cause the second display unit to transition from the stopped state to the standby state; and
cause the second display unit to transition to the activated state subsequent to the transition from the stopped state to the standby state.

5. The information processing apparatus according to claim 3, wherein
the first display unit includes a light source and a display element, and
the display control unit is further configured to cause the first display unit to transition to the non-light-emitting state by turning off a power supply that supplies power to the light source that irradiates the display element of the first display unit with light.

6. The information processing apparatus according to claim 2, further comprising:
a first output control unit configured to control output of the first video signal to the first display unit via the first bus; and
a second output control unit configured to control output of the second video signal to the second display unit via the second bus.

7. The information processing apparatus according to claim 6, wherein
the first output control unit is further configured to stop the output of the first video signal to the first display unit in the case where the display of the video is switched, and
the second output control unit is further configured to start the output of the second video signal to the second display unit in the case where the display of the video is switched.

8. The information processing apparatus according to claim 7, wherein the first output control unit is further configured to stop the output of the first video signal to the first display unit after the first display unit is transitioned to the stopped state.

9. The information processing apparatus according to claim 7, wherein the display control unit is further configured to:
control the first process to cause the first display unit to transition from the activated state to the stopped state; and
control the second process to cause the second display unit to transition from the stopped state to the activated state in parallel with the first process.

10. The information processing apparatus according to claim 6, wherein
the first output control unit is further configured to continue supply of the first video signal to the first display unit regardless of a state of the first display unit, and
the second output control unit is further configured to continue supply of the second video signal to the second display unit regardless of a state of the second display unit.

11. The information processing apparatus according to claim 10, wherein the display control unit is further configured to:
control the first process to cause the first display unit to transition from the activated state to the stopped state; and
control the second process to cause the second display unit to transition from the stopped state to the activated state in parallel with the first process.

12. The information processing apparatus according to claim 1, wherein the display control unit is further configured to cause the second display unit to transition from the standby state to the activated state after causing the first display unit to transition from the activated state to the standby state.

13. The information processing apparatus according to claim 1, wherein
the light-emitting state is a state in which a light source that irradiates a display element of a display unit with light is turned on in a case where the display unit includes the light source as a backlight, and is a state in which the display unit is turned on and a specific video different from a black image is displayed in a case where the display unit is of a self-light-emitting type, the non-light-emitting state is a state in which the light source is turned off in the case where the display unit includes the light source as the backlight, and is one of a state in which the display unit is turned on and the black image is displayed or a state in which the display unit is turned off in the case where the display unit is of the self-light-emitting type, the activated state is a state in which the display element is turned on and the light source emits the light in the case where the display unit includes the light source as the backlight, and is a state in which the display unit is turned on and the specific video different from the black image is displayed in the case where the display unit is of the self-light-emitting type, the standby state is a state in which the display element is turned on and the light source does not emit the light in the case where the display unit includes the light source as the backlight, and is a state in which the display unit is turned on and the black image is displayed in the case where the display unit is of the self-light-emitting type, and the stopped state is a state in which the display element and the light source are turned off in the case where the display unit includes the light source as the backlight, and is a state in which the display unit is turned off in the case where the display unit is of the self-light-emitting type.

14. The information processing apparatus according to claim 1, further comprising:
the first display unit;
the second display unit;
the first bus; and
the second bus.

15. The information processing apparatus according to claim 14, further comprising an imaging unit, wherein
one of the first display unit or the second display unit is a monitor, and
another of the first display unit or the second display unit is an electronic view finder (EVF).

16. A display control method, comprising:
in an information processing apparatus:
in a case where display of a video is switched from a first display unit to which a first video signal is input via a first bus to a second display unit to which a second video signal is input via a second bus:
causing the first display unit to transition from an activated state in which operation is performed in a light-emitting state to one of a standby state in which operation is performed in a non-light-emitting state or a stopped state in which operation is stopped in the non-light-emitting state; and
causing the second display unit caused to transition from one of the standby state or the stopped state to the activated state.

17. A non-transitory computer-readable medium having stored thereon, computer-executable instructions which, when executed by a computer, cause the computer to execute operations, the operations comprising:
in a case where display of a video is switched from a first display unit to which a first video signal is input via a first bus to a second display unit to which a second video signal is input via a second bus:
causing the first display unit to transition from an activated state in which operation is performed in a light-emitting state to one of a standby state in which operation is performed in a non-light-emitting state or a stopped state in which operation is stopped in the non-light-emitting state; and
causing the second display unit to transition from one of the standby state or the stopped state to the activated state.

18. An imaging apparatus, comprising:
an imaging unit;
a first bus;
a second bus;
a first display unit to which a first video signal based on a video signal captured by the imaging unit is input via the first bus;
a second display unit to which a second video signal based on the video signal captured by the imaging unit is input via the second bus; and
a display control unit configured to, in a case where display of a video is switched from the first display unit to the second display unit:
cause the first display unit to transition from an activated state in which operation is performed in a light-emitting state to one of a standby state in which operation is performed in a non-light-emitting state or a stopped state in which operation is stopped in the non-light-emitting state; and
cause the second display unit to transition from one of the standby state or the stopped state to the activated state.

19. An information processing apparatus, comprising:
a display control unit configured to, in a case where display of a video is switched from a first display unit to which a first video signal is input via a first bus to a second display unit to which a second video signal is input via a second bus:
control a first process to cause the first display unit to transition from a light-emitting state to a non-light-emitting state; and
control a second process to cause the second display unit to transition from the non-light-emitting state to the light-emitting state to be performed in parallel with the first process.

\* \* \* \* \*